United States Patent
Link

(10) Patent No.: US 10,302,073 B2
(45) Date of Patent: May 28, 2019

(54) AXIAL HYDRAULIC PISTON PUMP

(71) Applicant: Parker-Hannifin Corporation, Cleveland, OH (US)

(72) Inventor: Todd Allen Link, Gray, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 169 days.

(21) Appl. No.: 15/482,862

(22) Filed: Apr. 10, 2017

(65) Prior Publication Data

US 2017/0306937 A1 Oct. 26, 2017

Related U.S. Application Data

(60) Provisional application No. 62/325,609, filed on Apr. 21, 2016.

(51) Int. Cl.
*F04B 1/20* (2006.01)
*F16H 39/04* (2006.01)

(52) U.S. Cl.
CPC .......... *F04B 1/2085* (2013.01); *F04B 1/2035* (2013.01); *F04B 1/2078* (2013.01); *F16H 39/04* (2013.01)

(58) Field of Classification Search
CPC .................................................... F04B 1/2085
USPC ................................................. 92/13; 60/487
See application file for complete search history.

(56) References Cited

U.S. PATENT DOCUMENTS

| | | | | |
|---|---|---|---|---|
| 4,627,330 A * | 12/1986 | Beck, Jr. | ............... | F01B 3/0076 384/2 |
| 7,172,394 B2 * | 2/2007 | Chung | ................. | F04B 1/2085 417/222.1 |
| 7,517,156 B2 * | 4/2009 | Kazama | ............... | F04B 1/2085 384/2 |
| 8,118,567 B2 * | 2/2012 | Mori | ..................... | F04B 1/2078 29/888.02 |
| 8,202,058 B2 * | 6/2012 | Lindholdt | ............ | F01B 3/0044 324/624 |
| 8,376,615 B2 * | 2/2013 | Becker | .................. | F04B 1/2085 384/2 |
| 9,046,084 B2 * | 6/2015 | Becker | .................. | F04B 1/2085 |
| 9,157,423 B2 * | 10/2015 | Tvaruzek | ............. | F04B 1/2014 |
| 2006/0266211 A1 * | 11/2006 | Larkin | ................. | F04B 1/2014 92/5 R |

* cited by examiner

*Primary Examiner* — Thomas E Lazo
(74) *Attorney, Agent, or Firm* — Renner, Otto, Boisselle & Sklar, LLP

(57) ABSTRACT

An axial piston pump including a housing, a cylinder block, and a swash block. The cylinder block is rotatable within the housing about a vertical axis and includes an array of openings in the cylinder block distributed about the vertical axis and an array of pistons reciprocatably movable within the respective openings. The swash block is rotatable about an axis of rotation that is transverse to the vertical axis, and the degree of rotation is configured to control the extent of reciprocation of the pistons as the cylinder block rotates. The swash block has arc shape conical bearing surfaces tilted relative to the axis of rotation that are configured to guide movement of the swash block rotationally about the axis of rotation and prevent movement of the swash block axially along the axis of rotation.

20 Claims, 18 Drawing Sheets

FIG. 18

AXIAL HYDRAULIC PISTON PUMP

RELATED APPLICATION DATA

This application claims the benefit of U.S. Provisional Application No. 62/325,609 filed Apr. 21, 2016, which is hereby incorporated herein by reference in its entirety.

FIELD OF INVENTION

The present invention relates generally to axial hydraulic pistons pumps, and more particularly to swash block assemblies for use in axial hydraulic piston pumps.

BACKGROUND

Axial hydraulic piston pumps are used in a variety of applications, whether as a stand alone pump or as part of, for example, a hydraulic transmission. The components of an axial hydraulic piston pump typically include a cylinder block, a group of pistons vertically movable within openings in the cylinder block, a swash block the underside of which the pistons bear against, and a pair of arch bushings seated within recesses having axially spaced walls on the upper surface of the swash block. The cylinder block rotates the group of pistons about a vertical axis. A control arm rotates the swash block about an axis of rotation. During rotation, the swash block slides relative to the bushings, causing the bottom of the swash block to tilt upward on one side of the rotation axis and downward on the opposite side of the rotation axis. As the cylinder block rotates, each piston moves vertically downward on the downward tilted side and vertically upward on the upward tilted side in sliding relation in the openings into and out of the cylinder block, which, in turn, causes fluid to be transferred. The dual swash block bushings are formed in a matching arch to guide the swash block about its axis of rotation in a single plane when actuated by for example the control arm input. The matching arch bushings provide a vertical force to the swash block to counter the forces produced by the piston rotating group.

Some existing swash block assemblies have various shortcomings, drawbacks, and disadvantages relative to certain applications. For example, the swash block bushings formed in matching arches along the axis of rotation do not supply any guidance for the swash block in the lateral or rotational (yaw) directions. Typically, the movement of the swash block in the lateral and yaw directions is limited by mechanical surfaces or edges that are not coated to reduce friction, for example the walls of the recesses in the swash block and/or walls of the housing in which the swash block is mounted. In turn, the contact with these surfaces under high force creates significant drag which translates to the amount of force needed to actuate the swash block through the control input by the operator. FIG. 22 shows contact stresses on the swash block in the form of different shades. The highest contact stresses, which are identified by the reference numeral 700 in FIG. 22, are at the walls where the sides of the arch bushings contact due to lateral movement of the swash block along the axis of rotation and/or yaw movement about the vertical axis.

The lack of guidance in the yaw direction also allows the swash block to move within that direction due to clearance between the edges of the bushings and the afore mentioned mechanical surfaces or edges such as walls of the swash block and/or housing. This movement is introduced by the actuation of the swash block by the control arm and is most significant when the actuation of the control arm is changed from one direction to the other. This freedom of movement of the swash block in the yaw direction allows for movement of the control arm input without a corresponding change in displacement of the pump until the contact with the mechanical surface or edge, for example walls, is made. This causes what is known as dead band, an undesirable effect in which there is an inaction or lag in action between the input of the control function and the corresponding change in what is being controlled.

Accordingly, there remains a need for further contributions in this area of technology.

SUMMARY OF INVENTION

The present invention provides, among other things, a swash block assembly that provides surfaces that are tilted relative to an axis of rotation of the swash block and that are configured to guide movement of the swash block rotationally about the axis of rotation and prevent movement of the swash block axially along the axis of rotation and rotatably about the vertical axis, which improves responsiveness between control input and the swash block and prevents or reduces dead band.

According to one aspect of the invention, an axial piston pump includes a housing, a cylinder block rotatable within the housing about a vertical axis and including an array of openings in the cylinder block distributed about the vertical axis and an array of pistons reciprocatably movable within the respective openings, a swash block rotatable about an axis of rotation that is transverse to the vertical axis, wherein the degree of rotation is configured to control the extent of reciprocation of the pistons as the cylinder block rotates, and arc shape conical bushings interposed between the swash block and an interior surface of the housing, wherein the arc shape conical bushings have surfaces tilted relative to the axis of rotation that are configured to guide movement of the swash block rotationally about the axis of rotation and prevent movement of the swash block axially along the axis of rotation.

Embodiments of the invention may include one or more of the following additional features separately or in combination.

The tilted surfaces of the arc shape conical bushings may be configured to prevent rotational movement of the swash block about a yaw axis that is transverse to the axis of rotation.

According to another aspect of the invention, an axial piston pump includes a housing, a cylinder block rotatable within the housing about a vertical axis and including an array of openings in the cylinder block distributed about the vertical axis and an array of pistons reciprocatably movable within the respective openings, and a swash block rotatable about an axis of rotation that is transverse to the vertical axis, wherein the degree of rotation is configured to control the extent of reciprocation of the pistons as the cylinder block rotates, wherein the swash block has arc shape conical bearing surfaces tilted relative to the axis of rotation that are configured to guide movement of the swash block rotationally about the axis of rotation and prevent movement of the swash block axially along the axis of rotation.

Embodiments of the invention may include one or more of the following additional features separately or in combination.

The arc shape conical bearing surfaces may include a pair of opposed arc shape conical bearing surfaces axially spaced apart along the axis of rotation.

The angle of tilt of one of the pair of arc shape conical bearing surfaces may be the same as the angle of tilt of the other of the pair of arc shape conical bearing surfaces.

The pair of opposed arc shape conical bearing surfaces may taper away from one another along the axis of rotation.

The axial piston pump may further include arc shape conical bushings interposed between the swash block and an interior surface of the housing, and the arc shape conical bushings may have surfaces tilted relative to the axis of rotation that cradle the swash block at the respective arc shape conical bearing surfaces.

The arc shape conical bushings may be tapered along the axis of rotation from one edge to an axially opposite edge.

An interior wall of the housing may define arc shape conical bearing surfaces tilted relative to the axis of rotation that cradle the swash block at the respective arc shape conical bearing surfaces of the swash block.

The axial piston pump may further include arc shape conical roller bearings interposed between the swash block and an interior surface of the housing, and the arc shape conical roller bearings may provide a plane of rollers tilted relative to the axis of rotation that cradle the swash block at the respective arc shape conical bearing surfaces of the swash block.

The arc shape conical roller bearings may be tapered along the axis of rotation from one edge to an axially opposite edge.

According to another aspect of the invention, a hydrostatic transmission may include an axial piston pump according to the invention, wherein rotation of the cylinder block controls the flow of hydraulic fluid from the pump to a hydraulic motor, and vice versa, to drive the hydraulic motor.

According to another aspect of the invention, a vehicle includes a hydrostatic transmission according to the invention, an engine for driving the cylinder block of the axial piston pump, and a drivetrain driven by the hydraulic motor.

According to another aspect of the invention, a swash block assembly includes a swash block having an axis of rotation and an opening that extends through the swash block along an axis transverse to the axis of rotation, the swash block including a bottom bearing portion that is configured to interface with a piston rotating group and a top portion that has arc shape bearing surfaces disposed angularly about the axis of rotation and axially on opposite sides of the opening that guide the swash block about the axis of rotation, wherein the arc shape bearing surfaces have conical shapes about the axis of rotation.

Embodiments of the invention may include one or more of the following additional features separately or in combination.

The arc shape bearing surfaces may be at opposing angles relative to the axis of rotation.

The arc shape bearing surfaces may include dual conical shape opposing surfaces.

The arc shape bearing surface may include one of a pair of arc shape conical bushings, a pair of arc shape conical roller bearings, or a pair of arc shape conical coated surfaces made of a low friction surface material.

The angles of the conical shapes of the arc shape bearing surfaces relative to the axis of rotation may be the same.

According to another aspect of the invention, an axial piston pump includes a housing, a cylinder block rotatable within the housing about a vertical axis and including an array of openings in the cylinder block distributed about the vertical axis and an array of pistons reciprocatably movable within the respective openings, a swash block rotatable about an axis of rotation that is transverse to the vertical axis, wherein the degree of rotation is configured to control the extent of reciprocation of the pistons as the cylinder block rotates, and at least one link coupled to a front portion of the swash block and actuatable to push and pull the front portion of the swash block about its axis of rotation in a manner that tilts the swash block relative to horizontal.

Embodiments of the invention may include one or more of the following additional features separately or in combination.

The at least one link may be a pair of links pivotably connected to the swash block at axially opposite ends thereof, or a single link pivotably connected to a center portion thereof.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

Figure 18:
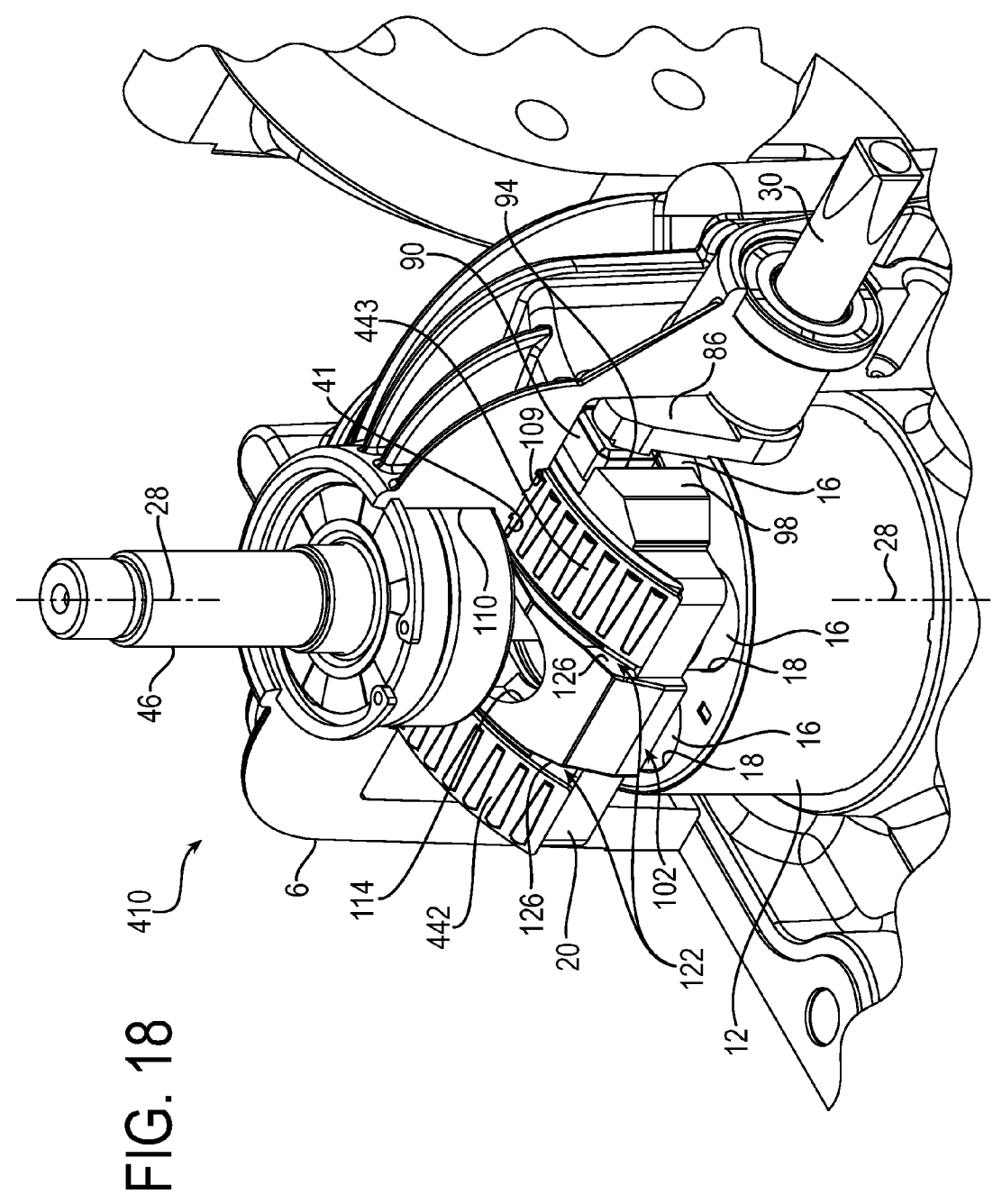

FIG. 18 is a perspective view of the FIG. 16 axial piston pump.

DETAILED DESCRIPTION

Figure 1:
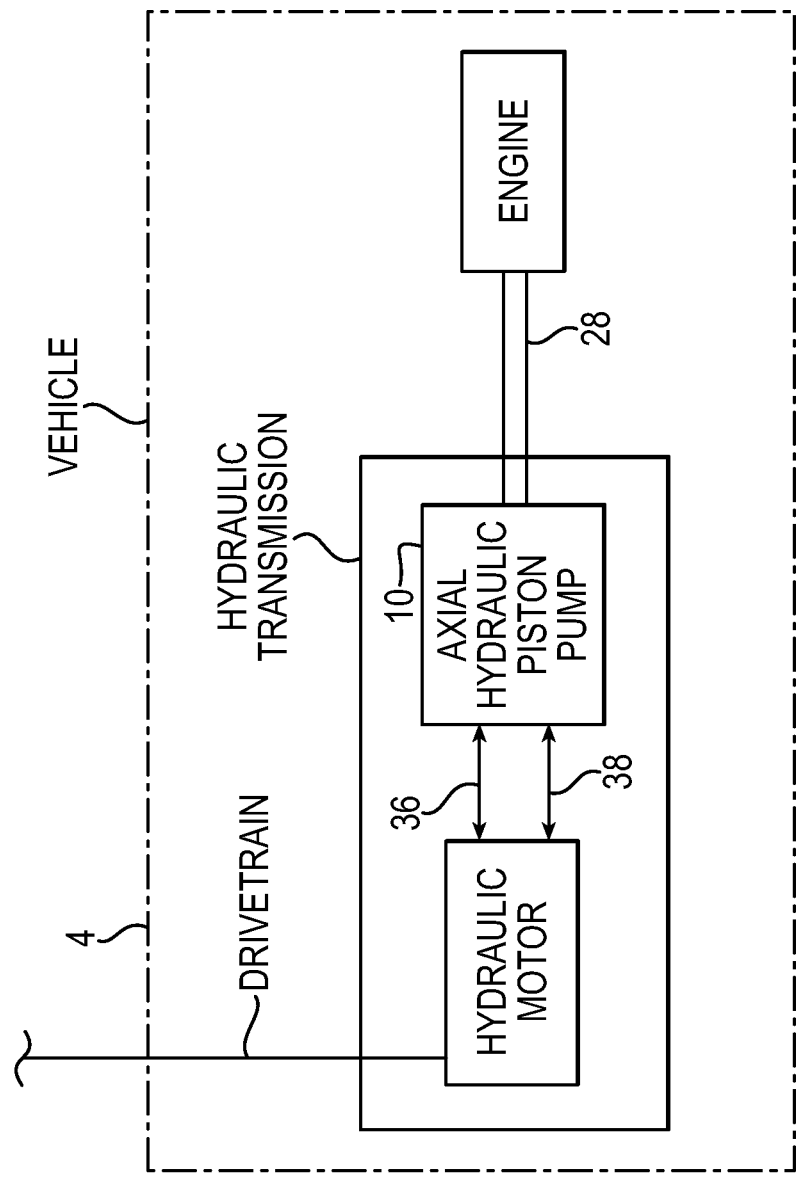
FIG. 1 is a schematic diagram of a vehicle incorporating an axial hydraulic piston pump according to the invention.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Referring now in detail to the drawings and initially to FIGS. 1-11, an exemplary axial hydraulic piston pump 10 according to the invention is indicated generally by reference numeral 10. The pump 10 is shown on board a vehicle such as a zero-turn riding mower, represented by the broken line 4 in FIG. 1, for driving a hydraulic motor of a hydrostatic transmission of the vehicle. The engine of the vehicle drives an input shaft 28 of the pump 10, which in turn hydraulically drives the motor via hydraulic fluid passages 36, 38. The motor in turn drives a drivetrain or other driven component of the vehicle. Although the axial piston pump 10 and associated system and method are herein described in relation to driving a hydraulic motor of a hydrostatic transmission, it will be appreciated by those skilled in the art that the pump 10, system, and method may have other applications, including for example, a standalone pump for multiple different applications. Applications may include machine tools, agricultural and construction equipment, marine and offshore auxiliary power, metal forming and stamping equipment, plastics processing machinery, to name a few.

The axial piston pump 10 includes an upper housing portion 6, a lower housing portion 8, a cylinder block 12, an array 14 of pistons 16 reciprocatably movable within openings 18 in the cylinder block 12, and a tiltable swash block 20. The pistons 16 are reciprocatably movable within the openings 18 in the cylinder block 12 along a vertical axis 28, and the swash block 20 is configured to tilt about an axis of rotation 34 that is transverse to, in the illustrative embodiment perpendicular to, the vertical axis 28. When the cylinder block 12 rotates the array of pistons 16 with the swash block 20 in a tilted position, the pistons 16 reciprocate within the openings 18 to draw and expel hydraulic fluid respectively through the pair of hydraulic fluid passages, or work ports 36, 38, in the lower housing portion 8, which in turn drive the hydraulic motor or other application. A pair of arc shape grooves 40, 41 in the upper housing portion 6 and a pair of arc shape conical bushings 42, 43 seated in the grooves 40, 41 cradle the swash block 20. As will be described in greater detail below, the swash block 20 has a pair of arc shape conical bearing surfaces 44, 45 that guide movement of the swash block 20 rotationally about the axis of rotation 34 and prevent movement of the swash block 20 axially along the axis of rotation 34 and rotatably about the vertical axis 28, which improves responsiveness between control input and the swash block 20 and prevents or reduces dead band.

FIGS. 2-8 show the exemplary axial hydraulic piston pump 10 in greater detail. A plurality of pistons 16, five in the illustrative embodiment, are arranged in a circular array about the vertical axis 28. The pistons 16 are slidably received within the openings 18, in the form of cylinders in the illustrative embodiment, in the cylinder block 12. In the illustrative embodiment, the axis of vertical movement of the pistons 16 is parallel to the vertical axis 28, although other configurations may be possible. An input shaft 46 rotatably supported at its opposite ends in the upper and lower housing portions 6, 8, is coupled to the cylinder block 12, for example by a spline connection, to rotate the cylinder block 12 about the vertical axis 28. The bottom surface 48 of the cylinder block 12 slides against an upper surface 50 of a manifold plate 54 that forms part of the lower housing portion 8. The bottom surface 48 of the cylinder block 12 has a plurality of arcuate slots 58, five in the illustrative embodiment, that are in fluid communication with the respective openings 18 that slidably receive the pistons 16. The upper surface 50 of the manifold plate 54 has a pair of arcuate slots 36, 38 that serve as the respective work ports 36, 38 of the pump 10. The arcuate slots 58 of the cylinder block 12 and the arcuate slots 36, 38 of the manifold plate 54 are disposed along a common radial distance from the vertical axis 28. As will be appreciated, as the input shaft 46 drives and rotates the cylinder block 12, the arcuate slots 58 slide over the work ports 36, 38 to direct hydraulic fluid to the work port 36 and from the work port 38, or vice versa to the work port 38 and from the work port 36, depending on the tilt of the swash block 20.

The pistons 16 protrude from the top of the cylinder block 12 and are biased toward the upward position. Any suitable biasing means may be used for biasing the pistons 16 upward. In the illustrative embodiment, each of the pistons 16 has a downward facing hollow 62 that receives a compression spring 66. The compression spring 66 sits on a ledge disposed near the bottom of the opening 18 and abuts the underside of the top 70 of the piston 16. The tops 70 of the pistons 16 bear against the underside 82 of the swash block 20. In some applications, a thrust bearing may be seated within a recess in the underside 82 of the swash block 20, with the tops 70 of the pistons 16 bearing against the underside of the thrust bearing, and the thrust bearing in turn bearing against an upper wall on the interior of the recess of the swash block 20. As the cylinder block 12 rotates, the springs 66 urge the tops 70 of the pistons 16 to impart a vertical force against the swash block 20. The swash block 20 functions as a cam to adjust the stroke or extent of reciprocation of the pistons 16. Thus, as the cylinder block 12 rotates, the tilt orientation of the swash block 20 provides a cam action that effects piston 16 reciprocation and thus pumping of hydraulic fluid. Thus, the amount of hydraulic fluid pumped per shaft 46 revolution, or the displacement of the pump 10, is based in part on the angle of tilt of the swash block 20. As will be appreciated, the interface between the pistons 16 and the swash block 20 need not be limited to the as-shown configuration and other embodiments are contemplated. For example, the tops 70 of the pistons 16 may bear against the underside 82 of the swash block 20 directly, or be pivotably mounted to low friction pads via spherical ball joints, wherein the pads, in turn, bear against the underside 82 of the swash block 20.

A control device 30 is configured to rotate the swash block 20 about its axis of rotation 34 to thereby tilt the swash block 20 relative to horizontal. The horizontal is a plane transverse to, in the illustrative embodiment perpendicular to, the vertical axis 28. The control device 30 shown in FIGS. 2-5 is in the form of a side-mounted control arm 30 rotatably supported in a side wall of the upper housing portion 6. The control arm 30 is coupled to a link 86 and slider block 90 that slides within a slot 94 in the side 98 of the swash block 20. The link 86 and slider block 90 allow the swash block 20 to be rotated about its axis of rotation 34 without the axis of rotation 34 passing through the structure of the swash block 20. The slider block 90 also enables the axis of rotation of the control arm 30 to be vertically offset from the axis of rotation 34 of the swash block 20, whether due to tolerance stackup, or by design for example due to space constraints within the pump housing. Rotation of the control arm 30 turns the link 86, which causes the slider block 90 to abut either side of the slot 94 to urge the swash block 20 about its axis of rotation 34. As the control device 30 rotates the swash block 20 for example counterclockwise in FIG. 2, the slider block 90 tilts the front 102 of the swash block 20 downward relative to horizontal, and the rear 106 of the swash black 20 upward relative to horizontal. Similarly, as the control device 30 rotates the swash block 20 clockwise in FIG. 2, the slider block 90 tilts the front 102 of the swash block 20 upward relative to horizontal, and the rear 106 of the swash block 20 downward relative to horizontal. Of course, other types of control devices 30 may be used to effect the tilting movement of the swash block 20. For example, in one form, a side mounted lever or side mounted plunger may be configured upon actuation to tilt the swash block 20. In another form, the swash block 20 may be connected at its opposite sides to opposing dowels or shafts supported by the sides of the housing. Further control devices 30 constructed in accordance with the invention will be described in greater detail below.

During counterclockwise tilting of the swash block 20 about its rotation axis 34, the bottom 82 of the swash block 20 tilts upward on one side of the axis 34, for example at the rear 106 of the swash block 20, and downward on the opposite side of the axis 34, for example at the front 102 of the swash block 20. Similarly, during clockwise tilting of the swash block 20 about its rotation axis 34, the bottom 82 of the swash block 20 tilts downward on one side of the axis 34, for example at the rear 106 of the swash block 20, and upward on the opposite side of the axis 34, for example at the front 102 of the swash block 20. This causes the pistons 16 on the upward tilted side of the swash block 20 to move upward owing to the spring bias of the pistons 16 toward the upward position, and urges the pistons 16 on the downward tilted side of the swash block 20 downward, that is, against the bias exerted by the springs 66. As the cylinder block 12 rotates, the tops 70 of the pistons 16 follow the cam underside 82 of the swash block 20 (or the cam underside of a thrust bearing if present), and in so doing impart vertical and horizontal forces against the swash block 20. The pistons 16 reciprocate axially within their respective openings 18 as the cylinder block 12 rotates the array 14 of pistons 16 about the vertical axis 28. More particularly, as the cylinder block 12 rotates, each piston 16 moves vertically downward on the downward tilted side of the swash block 20 and vertically upward on the upward tilted side of the swash block 20 as the tops 70 of the pistons 16 slide under and bear against the underside 82 of the swash block 20; or in applications with a thrust bearing interposed between the pistons 16 and swash block 20, as the tops 70 of the pistons 16 slide under and bear against the underside of the thrust bearing, and the thrust bearing in turn bears against the underside 82 of the swash block 20.

In operation, the control device 30 is operable to direct hydraulic fluid through the work ports 36, 38 of the manifold plate 54 in either direction. For example, when the control device 30 tilts the front 102 of the swash block 20 downward relative to horizontal and the rear 106 of the swash block 20 upward relative to horizontal, the pistons 16 will move downward at the front 102 of the swash block 20 and upward at the rear 106 of the swash block 20. Thus, as the cylinder block 12 rotates clockwise about the vertical axis 28, a piston 16 will be carried about the axis 28, moving axially downward as it is urged against the cam underside 82 from the upward tilted rear 106 of the swash block 20 to the downward tilted front 102 of the swash block 20, and then thereafter axially upward as it is urged against the cam underside 82 from the downward tilted front 102 of the swash block 20 to the upward tilted rear 106 of the swash block 20. This completes one revolution of the cylinder block 12 and one reciprocation of the piston 16. Each additional rotation of the cylinder block 12 results in an additional reciprocation cycle of the piston 16. As the piston 16 moves downward the piston 16 expels hydraulic fluid through the work port 36, and as the piston 16 moves upward the piston 16 draws hydraulic fluid through the work port 38. The other four pistons 16 of the array 14 function in a similar manner, resulting in continuous discharge of hydraulic fluid through the work port 36 and continuous drawing of hydraulic fluid through the work port 38.

Figure 2:
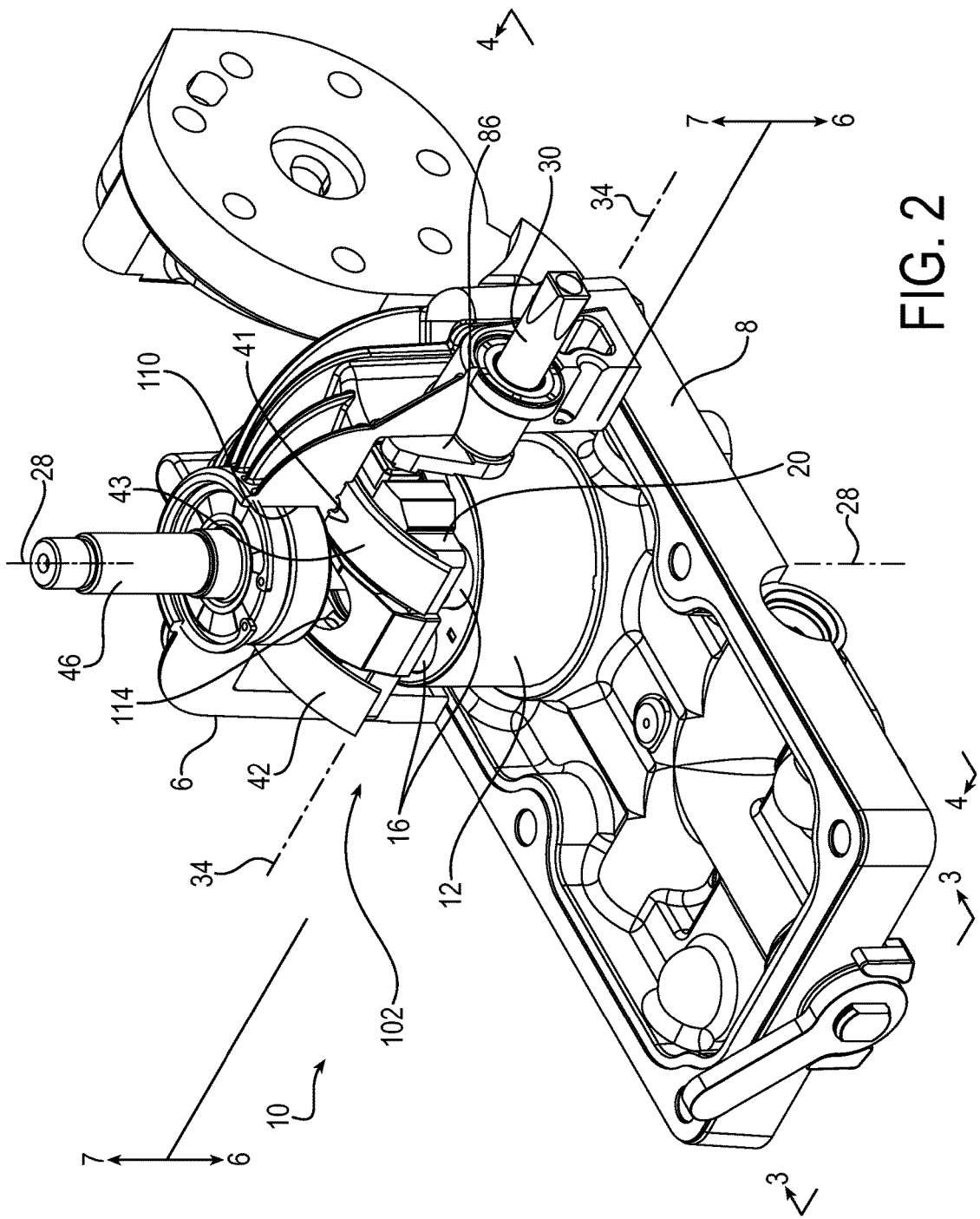
FIG. 2 is a perspective view of an axial hydraulic piston pump according to the invention.
Figure 3:
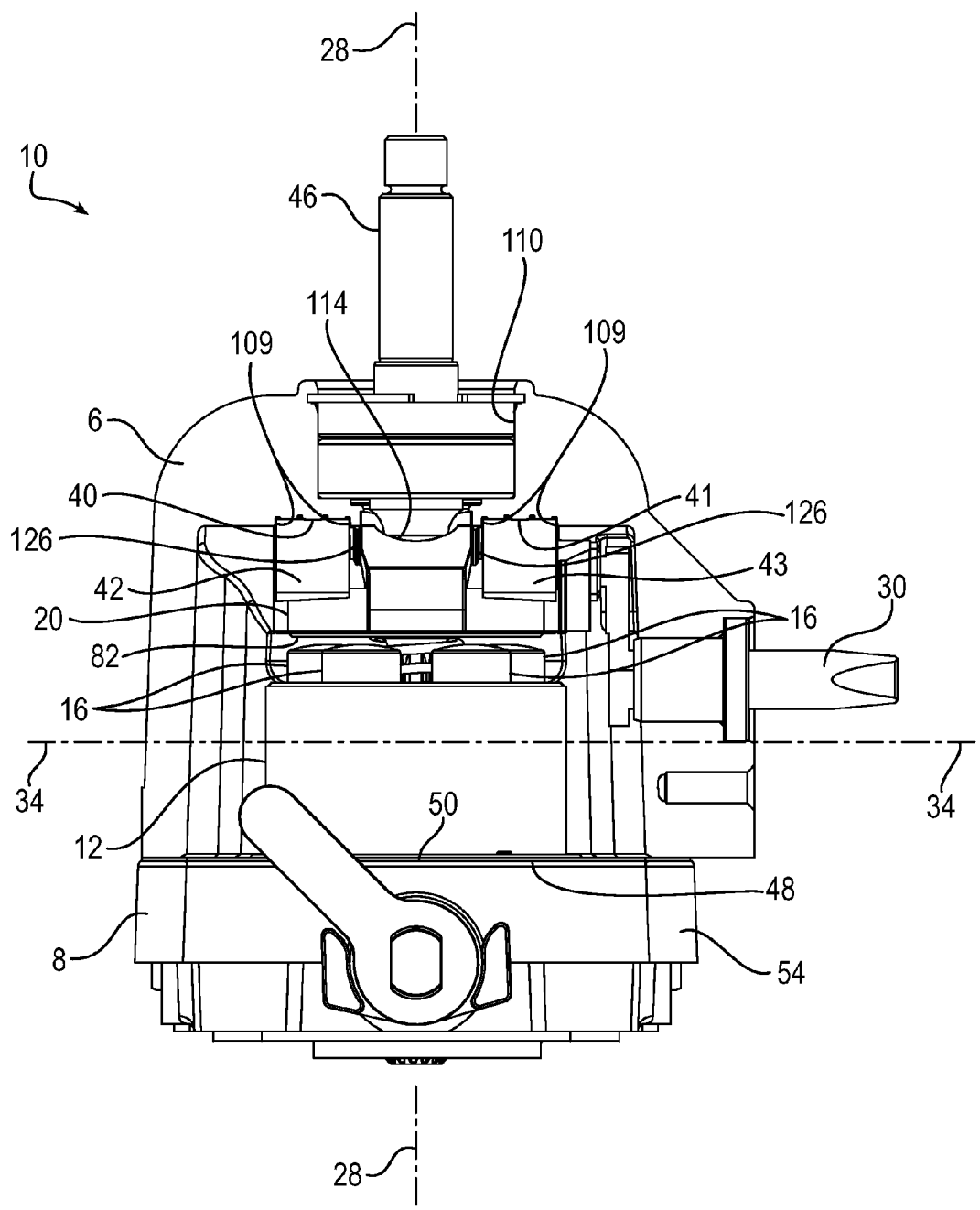
FIG. 3 is a front elevation view of the FIG. 2 axial piston pump as viewed from the plane 3-3 in FIG. 2.
Figure 4:
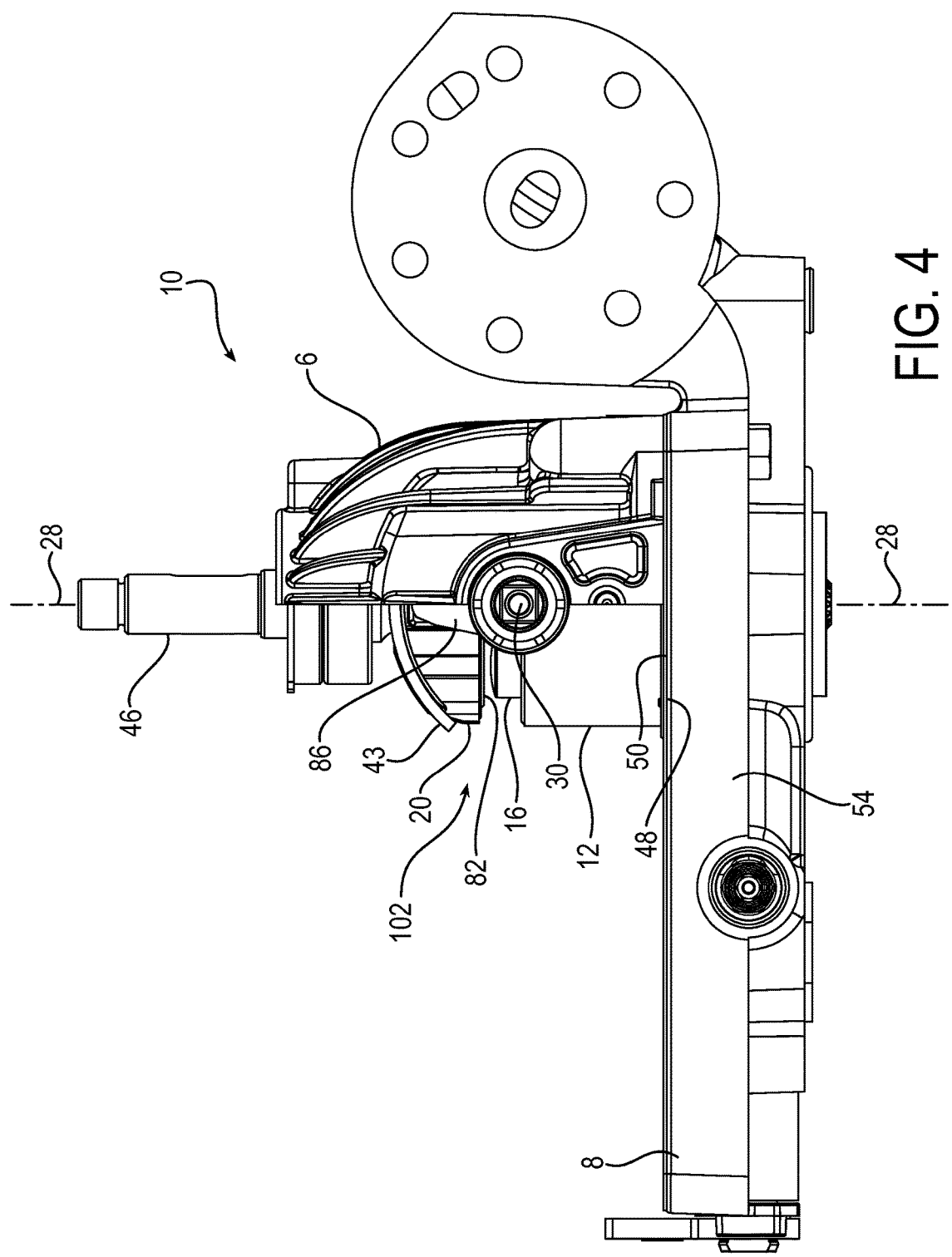
FIG. 4 is a side elevation view of the FIG. 2 axial piston pump as viewed from the plane 4-4 in FIG. 2.
Figure 5:
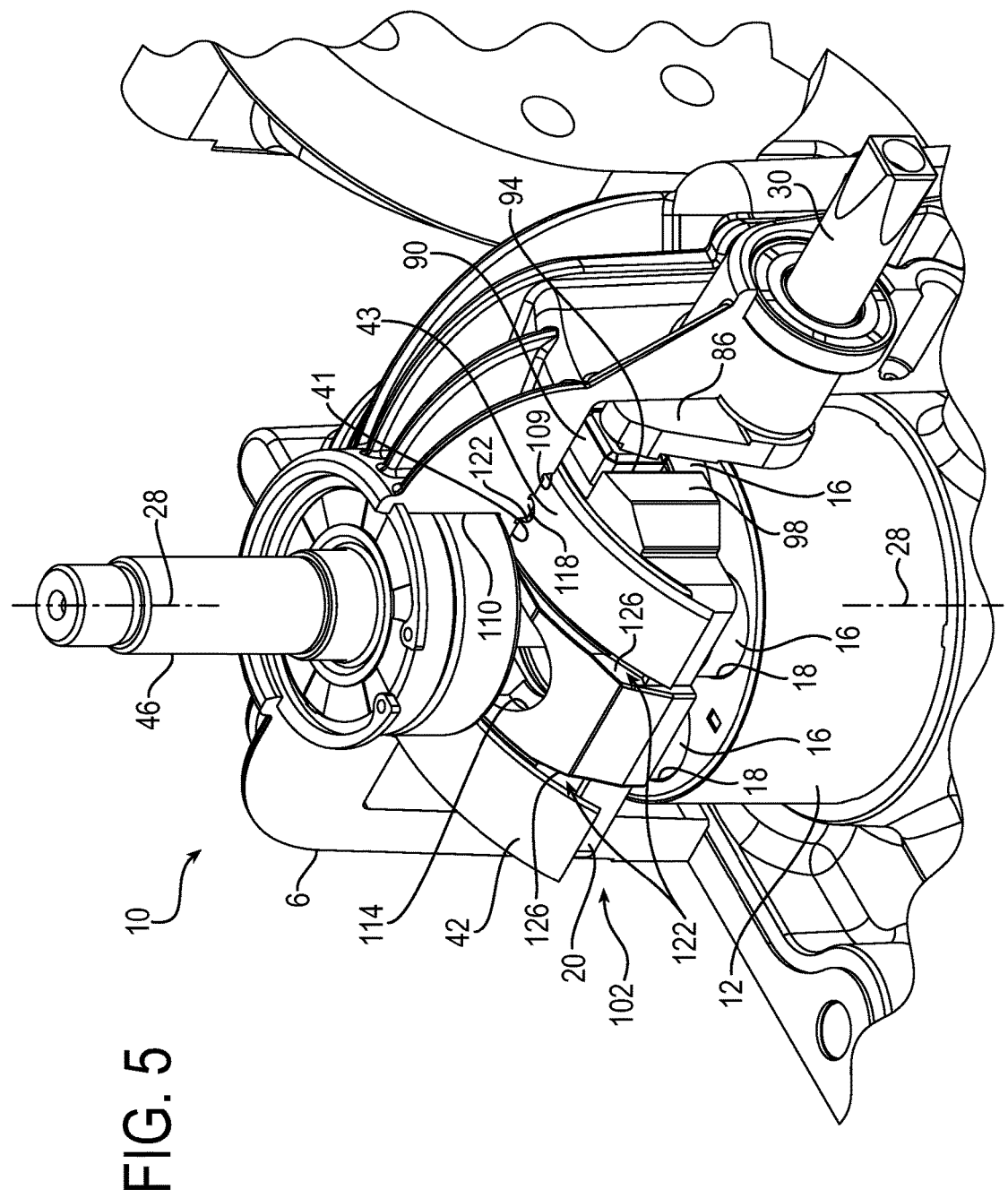
FIG. 5 is a perspective view of the FIG. 2 axial piston pump.
Figure 6:
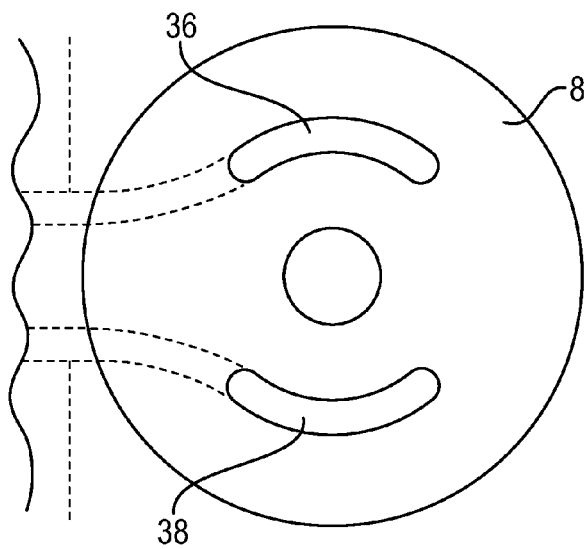
FIG. 6 is a top plan view of manifold work ports of the FIG. 2 axial piston pump as viewed from the plane 6-6 in FIG. 2.
Figure 7:
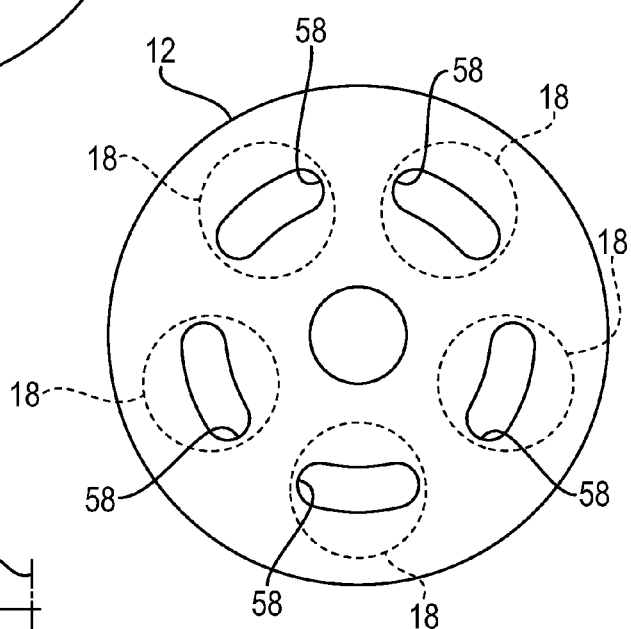
FIG. 7 is a top plan view of cylinder block work ports of the FIG. 2 axial piston pump as viewed from the plane 7-7 in FIG. 2.
Figure 8:
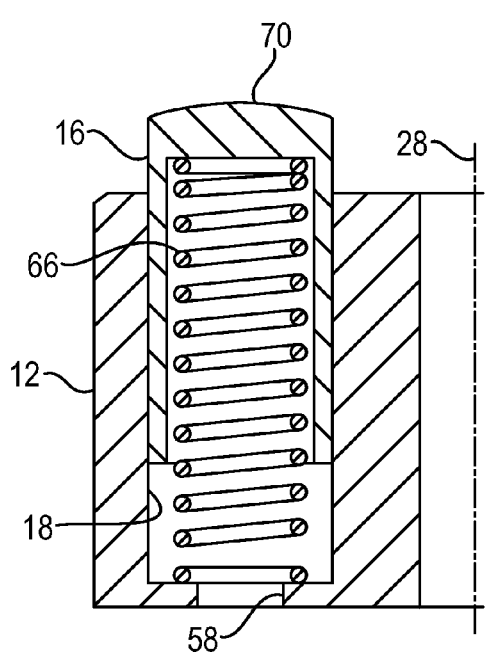
FIG. 8 is a cross section of the cylinder block of the FIG. 2 axial piston pump, showing the piston and cylinder thereof.

To reverse the flow of hydraulic fluid through the work ports 36, 38, the control device 30 tilts the swash block 20 clockwise in FIG. 2, so that the front 102 of the swash block 20 is tilted upward relative to horizontal, and the rear 106 of the swash block 20 is tilted downward relative to horizontal. As such, the pistons 16 move upward at the front 102 of the swash block 20 and downward at the rear 106 of the swash block 20. Continuous rotation of the cylinder block 12 and the array 14 of pistons 16 results in continuous discharge of hydraulic fluid through the work port 38 and continuous drawing of hydraulic fluid through the work port 36.

To cease flow through the work ports 36, 38, the control device 30 rotates the swash block 20 to a position at which its underside 82 is not tilted relative to horizontal, that is, so that there is no tilt in the front 102 or the rear 106 of the swash block 20. As the cylinder block 12 rotates, the pistons 16 do not reciprocate, and instead remain axially fixed within their respective openings 18 and axially fixed relative to one another. As such, hydraulic fluid is neither expelled from nor drawn through the work ports 36, 38.

Referring now more closely to FIGS. 2-5, details of the swash block 20 and upper housing portion 6 interface will be described. The swash block 20 is slidably mounted within the upper housing portion 6 of the pump 10 for radially and axially guided tilting movement between the afore described upward and downward tilted positions. As shown in FIGS. 2-5, the upper housing portion 6 has a pair of arc shape grooves 40, 41 defined at their edges by axially spaced walls 109 depending from the interior wall of the upper housing portion 6. A pair of arc shape conical bushings 42, 43 are interposed between the grooves 40, 41 and the upper surface of the swash block 20. In the illustrative embodiment, the grooves 40, 41 receive the pair of arc shape conical bushings 42, 43 which, in turn, cradle respective arc shape conical bearing surfaces 44, 45 of the swash block 20. The bushings 42, 43 can be made of any suitable bearing materials, such as steel with a bronze coating. Each pair of grooves 40, 41, bushings 42, 43, and bearing surfaces 44, 45 is axially spaced in the direction of the rotation axis 34, and openings 110, 114 extend therebetween through the upper housing portion 6 and the swash block 20 along the vertical axis 28 to accommodate passage therethrough of the input shaft 46. Thus, the bushings 42, 43 are disposed on axially opposite sides of the swash block opening 114 or otherwise straddle the swash block opening 114. Protrusions 118 depend from the interior wall of the upper housing portion 6 that fit into holes 122 in the bushings 42, 43 to aid in locating and holding the bushings 42, 43 in place relative to the upper housing portion 6. The bushings 42, 43 seat within recesses 122 on the upper surface of the swash block 20. Axially spaced walls 126 adjacent to the recesses 122 fit between inner axially spaced walls 109 of the upper housing portion 6.

The spring-biased pistons 16 maintain an upward biasing force against the swash block 20, the bushings 42, 43, and the upper housing portion 6. During tilting of the swash block 20 about the axis 34, the arc shape conical bearing surfaces 44, 45 of the swash block 20 bear against, and slide relative to, the arc shape conical bushings 42, 43. The sliding movement of the swash block 20 along the arc shape conical bushings 42, 43 causes the bottom 82 of the swash block 20 to tilt upward relative to horizontal on one side of the rotation axis 34 and downward relative to horizontal on the opposite side of the rotation axis 34, to thereby induce the change in angle of the piston rotating group 14 that causes hydraulic fluid to be transferred through the work ports 36, 38, as described above.

Figure 9:
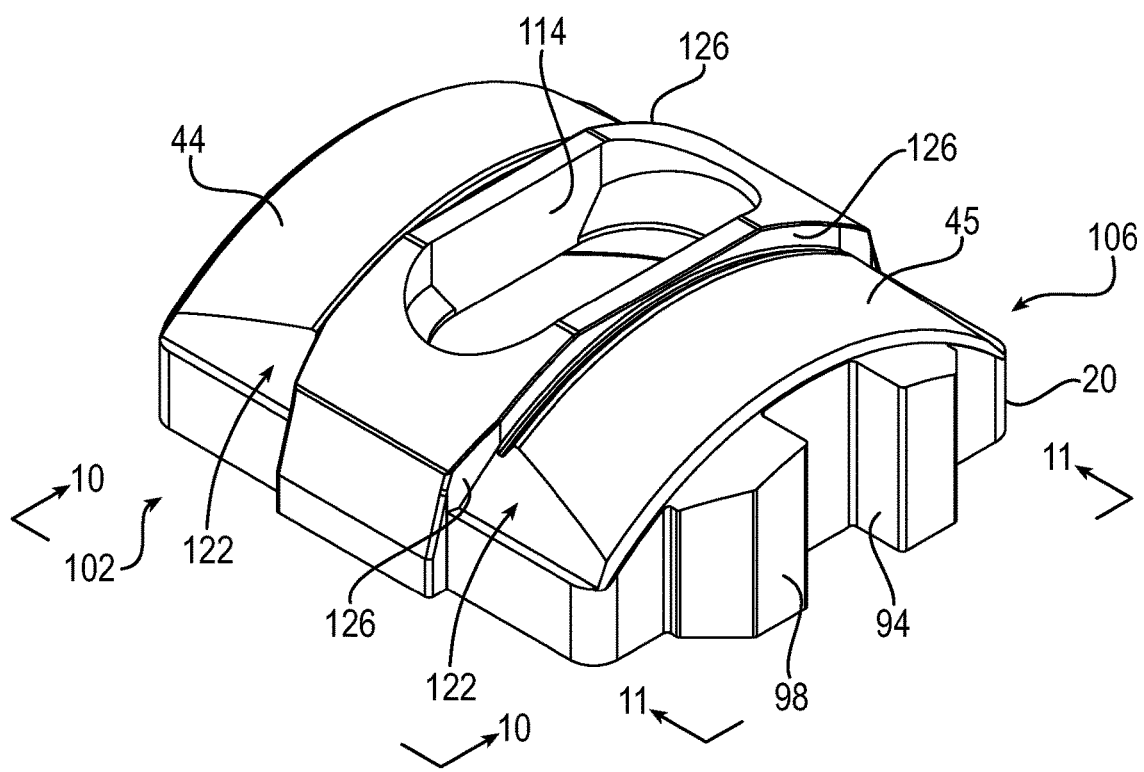
FIG. 9 is a perspective view of a swash block assembly according to the invention.
Figure 10:
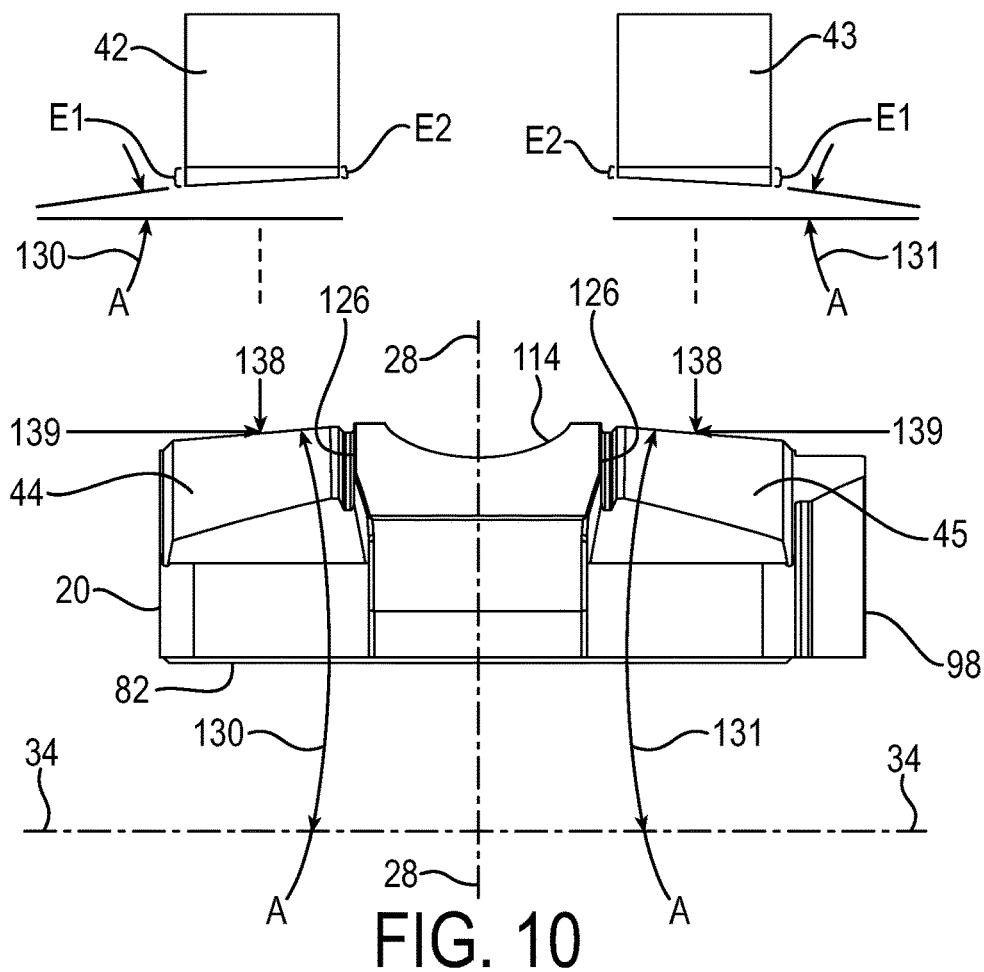
FIG. 10 is a front elevation view of the FIG. 9 swash block assembly as viewed from the plane 10-10 in FIG. 9, additionally showing conical bushings according to the invention.
Figure 11:
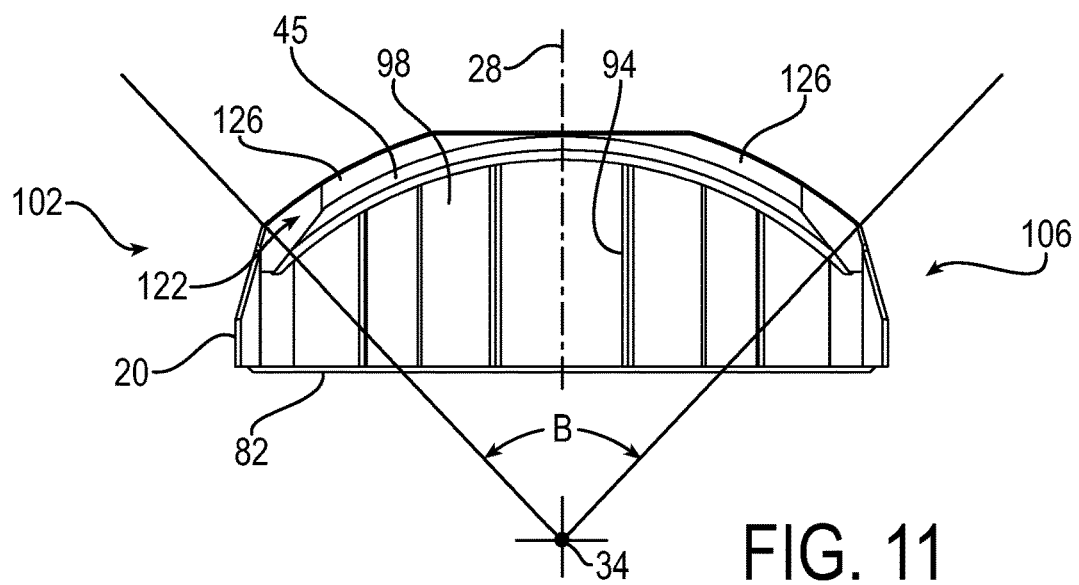
FIG. 11 is a side elevation view of the FIG. 9 swash block assembly as viewed from the plane 11-11 in FIG. 9.
Figure 12:
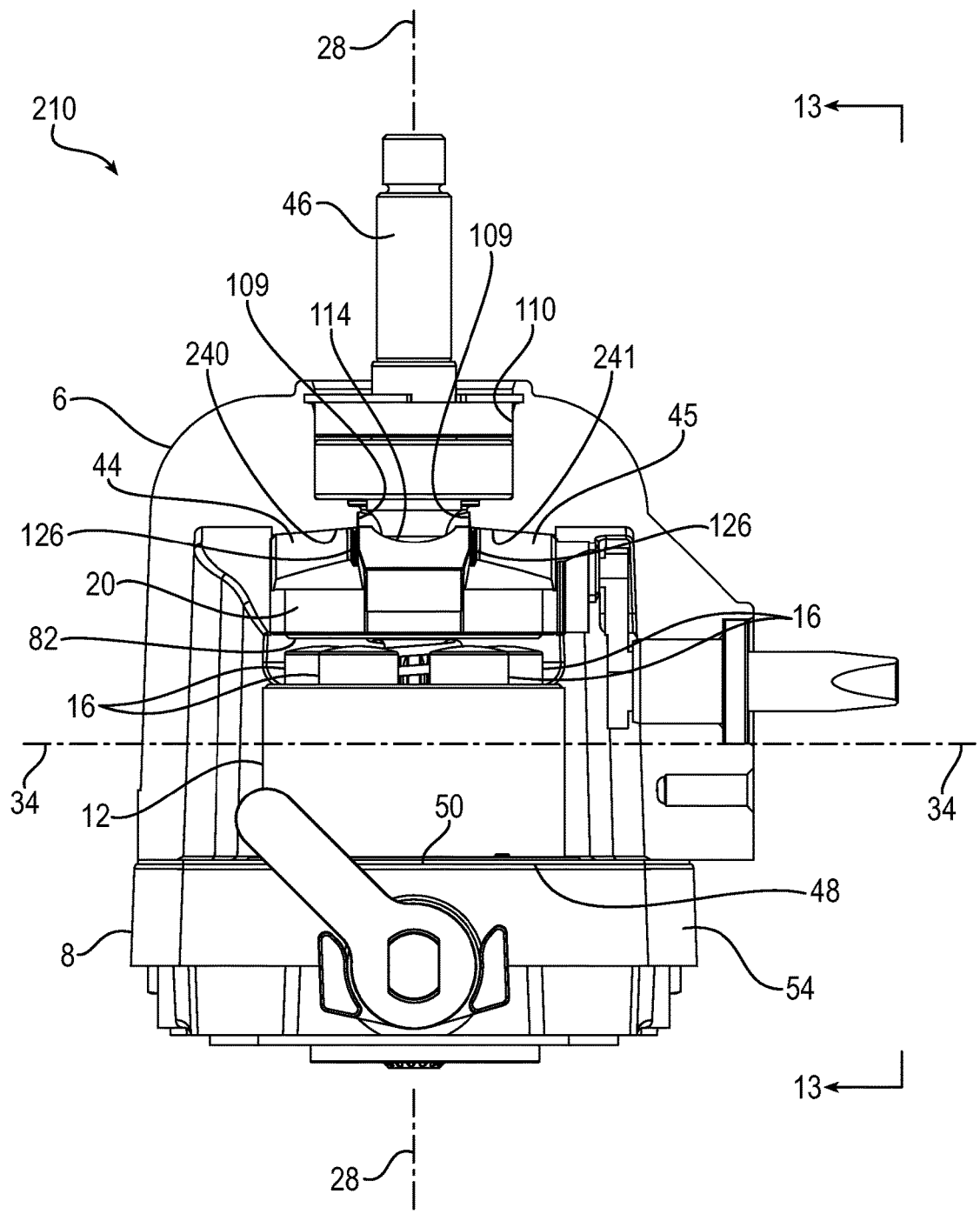
FIG. 12 is a front elevation view of an axial hydraulic piston pump according to another embodiment of the invention.
Figure 13:
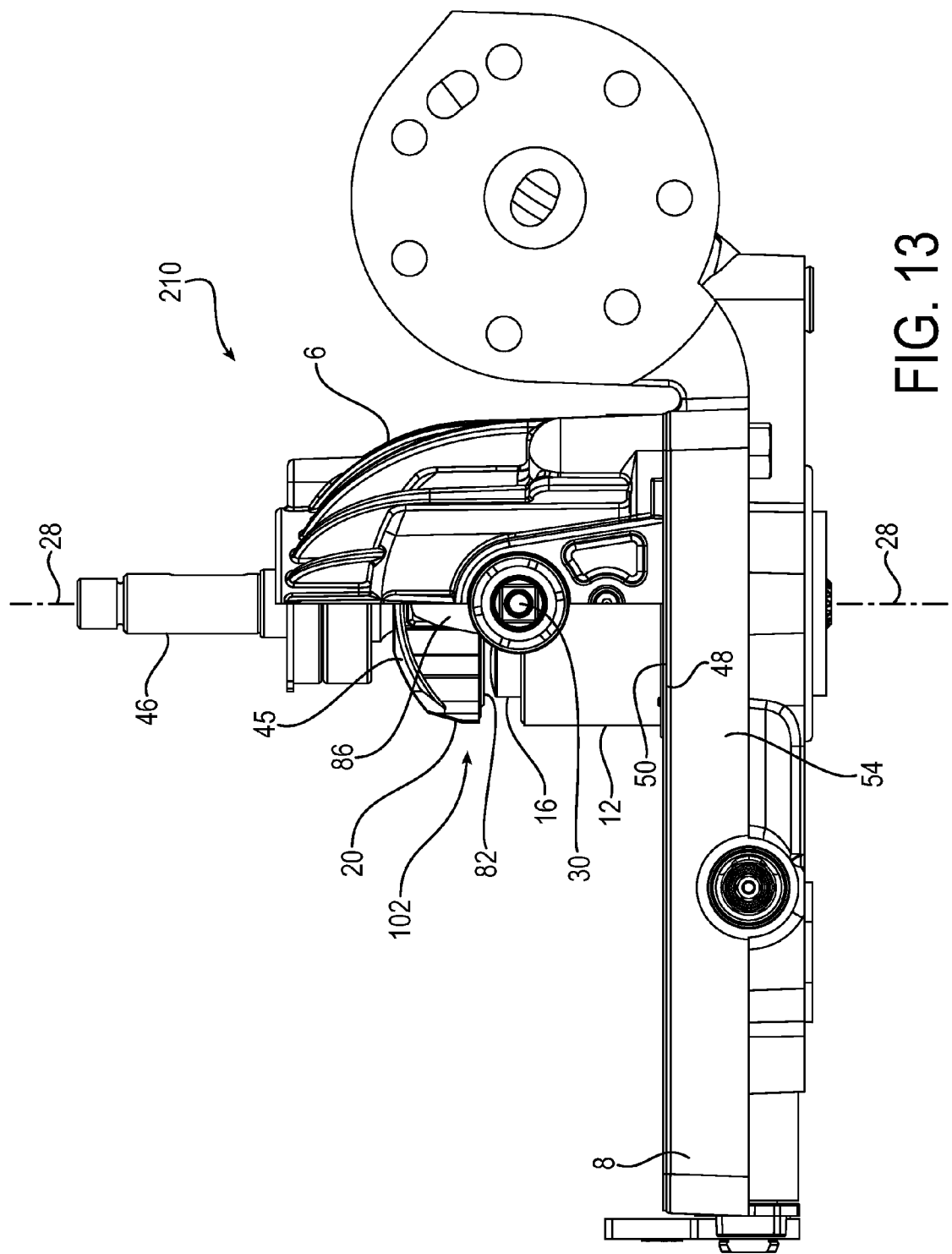
FIG. 13 is a side elevation view of the FIG. 12 axial piston pump as viewed from the plane 13-13 in FIG. 12.
Figure 14:
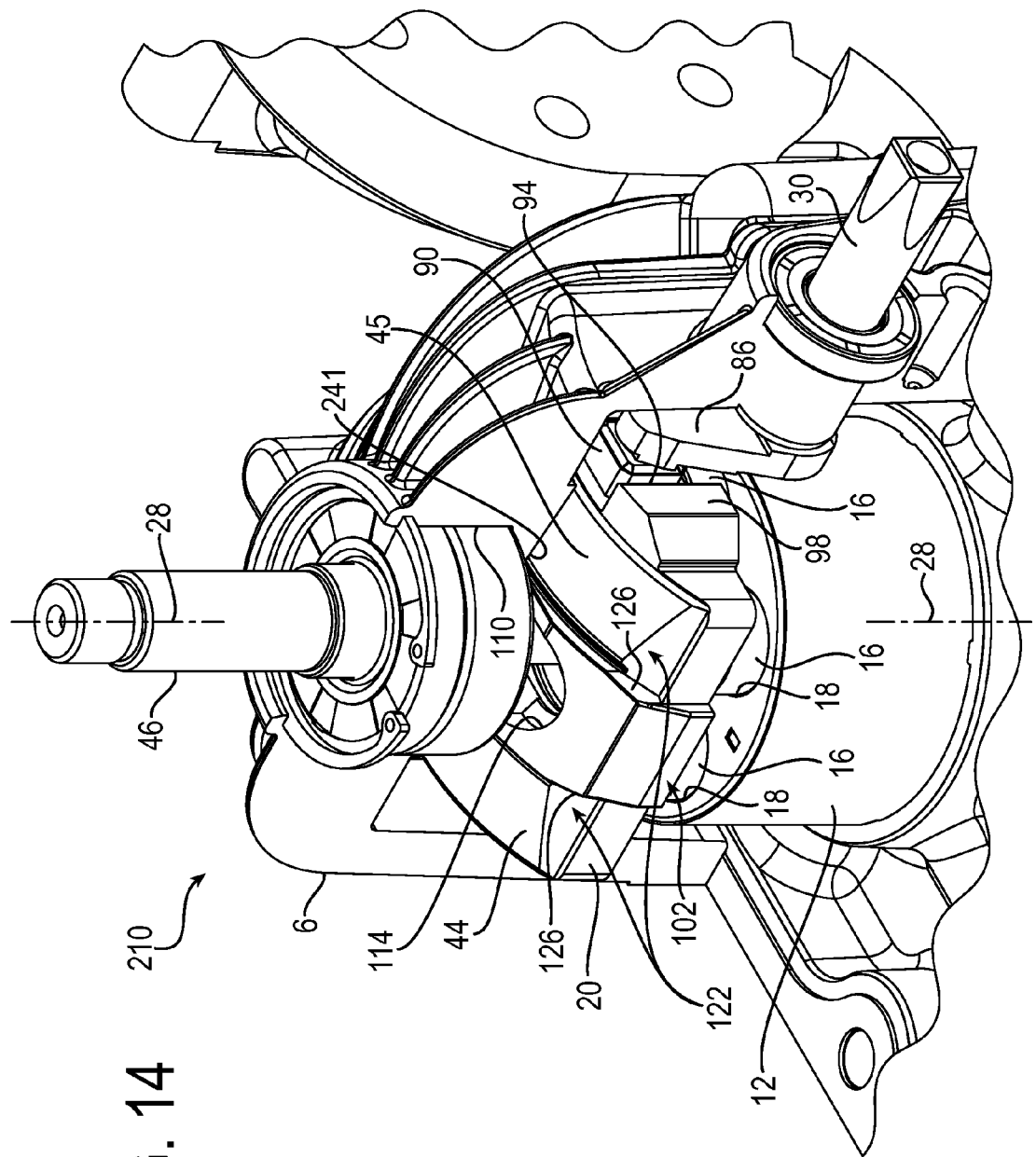
FIG. 14 is a perspective view of the FIG. 12 axial piston pump.

Referring now more closely to FIG. 9-11, shown in greater detail are the configurations and mating surfaces of the components of the swash block 20 and the arc shape conical bushings 42, 43. The arc shape conical bearing surfaces 44, 45 of the swash block 20 have opposing conical shapes 130, 131 about the axis of rotation 34 of the swash block 20. Likewise, the arc shape conical bushings 42, 43 have opposing conical shapes 130, 131 about the axis of rotation 34 of the swash block 20. One way for the arc shape conical bushings 42, 43 to realize the opposing conical shapes 130, 131, as shown for example in FIG. 10, is for the arc shape conical bushings 42, 43 themselves to be tapered along the axis of rotation 34 from one edge E1, the inner edge in the FIG. 10 embodiment, to an axially opposite edge E2, the outer edge in the FIG. 10 embodiment. In the illustrative embodiment, there are two arc shape conical bushings 42, 43 axially spaced apart along the axis of rotation 34 and disposed on axially opposite sides of the opening 114 passing through the swash block 20. The angle of tilt A of the opposing conical shapes 130, 131 relative to horizontal, which is relative to the axis of rotation 34 in the illustrative embodiment, is the same for the opposing conical shapes 130, 131, and is shown to be about five (5) degrees. The opposing conical shapes 130, 131 taper in opposite directions, in FIG. 10 away from one another along the axis of rotation 34, i.e. in the direction away from the center of the swash block 20 or the opening 114 in the swash block 20. As shown in FIG. 11, the opposing conical shapes 130, 131 are disposed angularly about the axis of rotation 34 of the swash block 20 to have an arc shape B of about 90 degrees.

Those skilled in the art will appreciate that the opposing conical surfaces need not be configured as shown in FIGS. 9-11, and other embodiments are contemplated. For example, another way for the arc shape conical bushings 42, 43 to realize the opposing conical shapes 130, 131, is for the bushings 42, 43 to have similar thickness from edge E1 to edge E2, and for the interior surface wall of the upper housing portion 6 to instead be tapered. The angle of tilt A of the opposing conical shapes 130, 131 may be different for the opposing conical shapes 130, 131, and the angle of tilt A may be less than or greater than five degrees, depending on the application and configuration of the axial piston pump 10. Thus, the conical shape 130 may have an angle of tilt A relative to horizontal that is larger (or smaller) than the angle of tilt A of the conical shape 131. Further, the opposing conical shapes 130, 131 may have tapers that approach one another along the axis of rotation 34, i.e. in the direction toward from the center of the swash block 20 or the opening 114 in the swash block 20. The opposing conical shapes 130, 131 may be disposed angularly about the axis of rotation 34 to have an arc shape other than 90 degrees, again depending on the application and configuration of the axial piston pump 10, for example, based on the desired interaction between the array 14 of pistons 16 and the underside 82 of the swash block 20.

In operation, the opposing conical shapes 130, 131 introduce radial alignment forces (vertical alignment forces in the illustrative embodiment) and axial alignment forces (horizontal alignment forces in the direction of the axis of rotation 34 in the illustrative embodiment), for example as shown at arrows 138, 139 in FIG. 10, due to the vertical and horizontal force vectors created by each cone angle 130, 131. The vertical force vector 138 imparted on the conical bearing surfaces 44, 45 of the swash block 20 counters, for example, the vertical forces produced by the piston rotating group 14, e.g. the upward biasing force exerted by the spring-biased pistons 16 against the underside 82 of the swash block 20, as well as the vertical component of the force exerted by the rotating cylinder block 12 through the pistons 16.

The horizontal force vector 139 imparted on the conical bearing surfaces 44, 45 of the swash block 20 counters, for example, the horizontal forces produced by the control device 30 on the swash block 20, as well as other horizontal forces such as those produced by the piston rotating group 14 or the cylinder block 12 through the pistons 16. As will be appreciated, when the control device 30 rotates the swash block 20 about its axis of rotation 34, the swash block 20 will have a tendency to move laterally along the axis 34 and a tendency to rotate about the vertical axis 28, also known as yaw movement. The axial, or thrust, component 139 imparted on the conical bearing surfaces 44, 45 provides guidance for the swash block 20 about its axis of rotation 34 while also providing guidance to prevent lateral movement of the swash block 20 along the axis 34 and prevent rotational movement about the vertical axis 28. As such, the conical bearing surfaces 44, 45 prevent misalignment of the swash block 20 relative to its axis of rotation 34. By preventing misalignment of the swash block 20, the conical bearing surfaces 44, 45 maintain clearances and thus prevent contact between the swash block 20 and mechanical surfaces or edges that are not coated to reduce friction, for example, contact between the edges of the arc shape conical bushings 42, 43 and the walls 109 depending from the interior wall of the upper housing portion 6, and/or contact between the walls 109 and the walls 126 of the swash block 20. As such, drag caused by the contact between these surfaces is eliminated or significantly reduced, and the amount of force needed to actuate the swash block 20 through the control device 30 by an operator is significantly reduced. Of particular significance, the horizontal alignment force 139 created by the opposing cone angles 130, 131 eliminates or significantly reduces dead band caused by movement of the swash block 20 in the yaw direction, or a change in actuation of the control device 30 from one direction to the other. The elimination or reduction of dead band provides the operator with an improved control feel and predictability of input to output or response of the axial piston pump 10.

Reference is now made to FIGS. 12-15, which show views of an axial hydraulic piston pump 210 according to another embodiment of the invention. The axial piston pump 210 of FIGS. 12-15 is in many respects substantially the same as the above-referenced axial piston pump 210 of FIGS. 2-11, and consequently the same reference numerals are used to denote structures corresponding to similar structures in the axial piston pump 10 of FIGS. 2-11. In addition, the foregoing description of the axial piston pump 10 of FIGS. 2-11 is equally applicable to the axial piston pump 210 of FIGS. 12-15, except as may be noted herein. Moreover, it will be appreciated upon reading and understanding the specification that aspects of the axial piston pumps 10, 210 may be substituted for one another or used in conjunction with one another where applicable.

The swash block 20 is slidably mounted within the upper housing portion 6 of the pump 210 for radially and axially guided tilting movement between the afore described upward and downward tilted positions. The upper housing portion 6 of the axial piston pump 210 includes a pair of arc shape conical bearing surfaces 240, 241 that depend from the interior surface of the upper housing portion 6 and into the recesses 122 in the upper surface of the swash block 20. The arc shape conical bearing surfaces 240, 241 cradle the respective arc shape conical bearing surfaces 44, 45 of the swash block 20. The arc shape bearing surfaces 44, 45 of the swash block 20 may be coated with a low friction surface material such as PTFE or the like to aid in the sliding action between the surfaces 44, 45 and surfaces 240, 241. The axially spaced walls 126 adjacent to the recesses 122 fit between inner axially spaced walls 109 of the upper housing portion 6.

Figure 15:
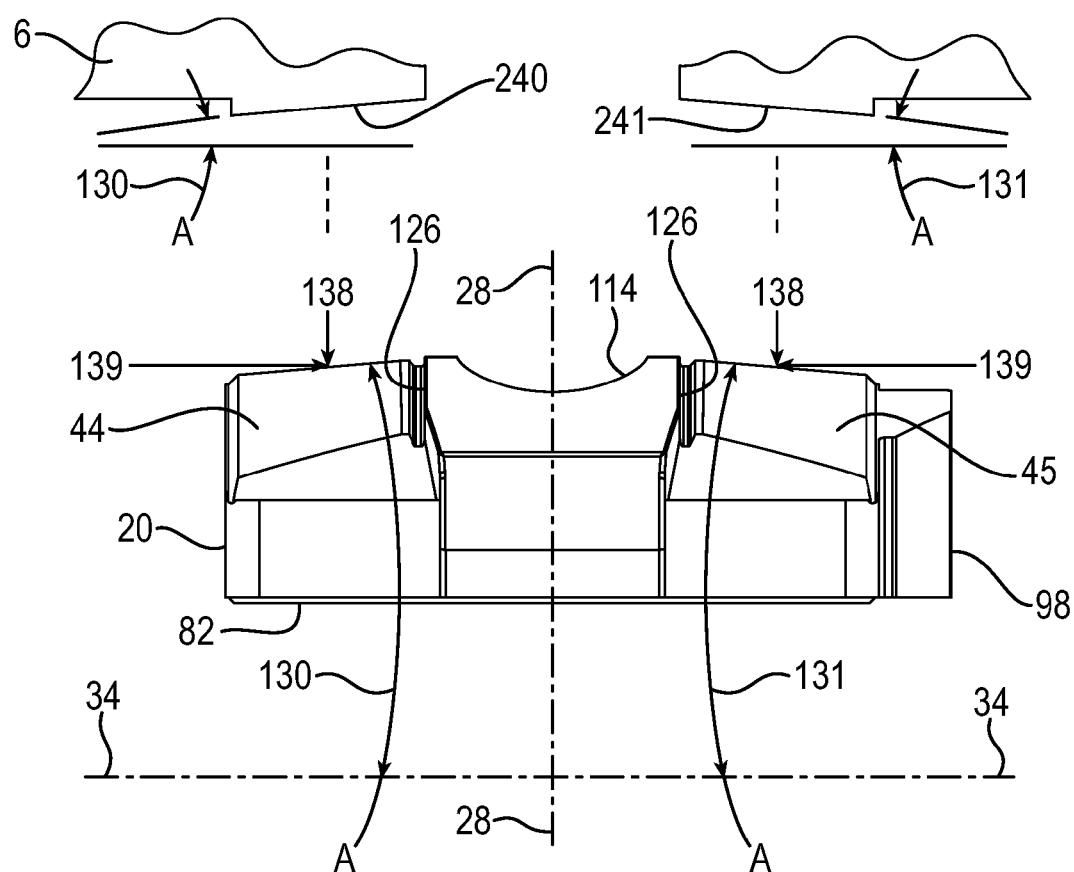
FIG. 15 is a front elevation view of a swash block assembly of the FIG. 12 axial piston pump, additionally showing a portion of an upper housing portion according to the invention.
Figure 16:
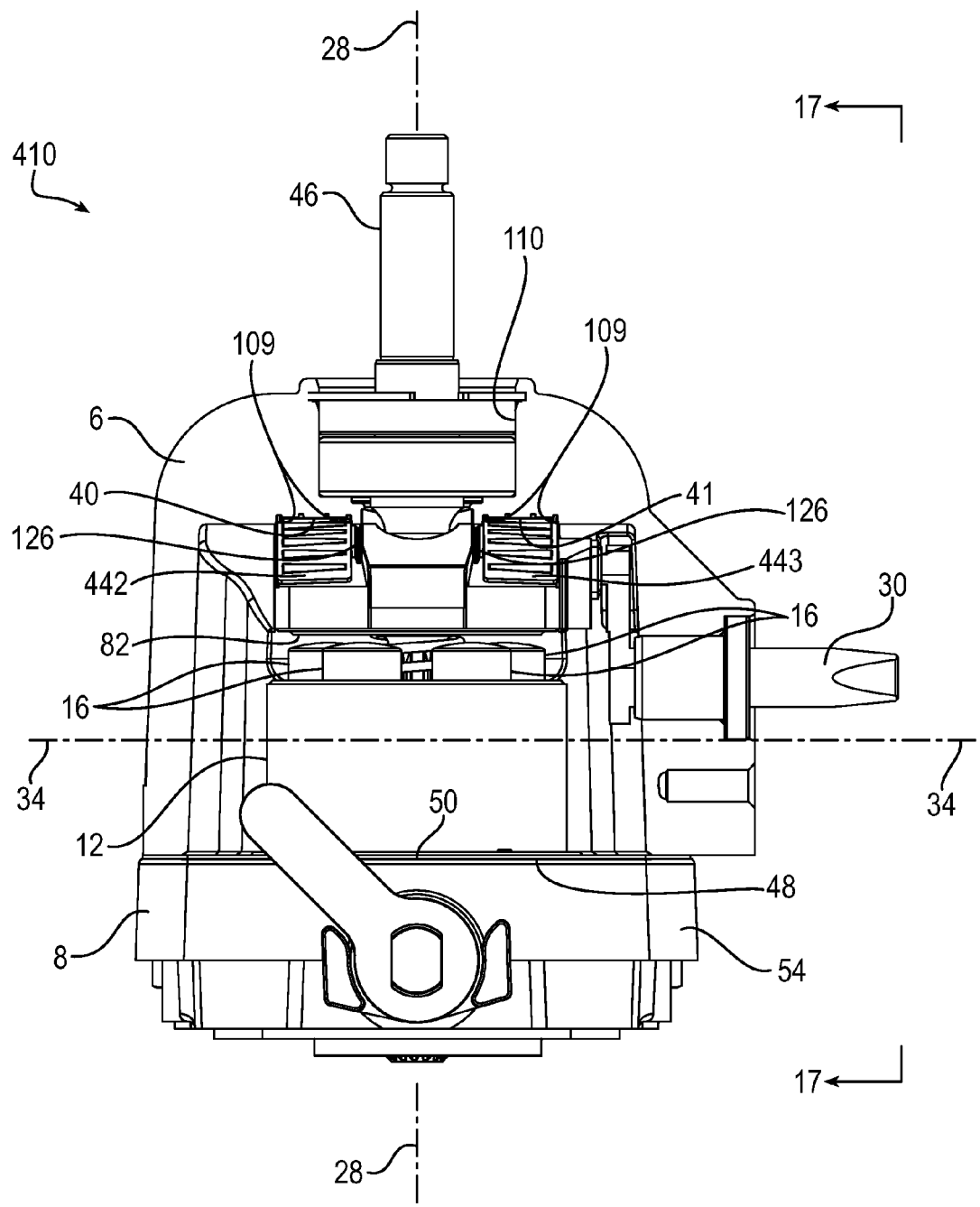
FIG. 16 is a front elevation view of an axial hydraulic piston pump according to another embodiment of the invention.
Figure 17:
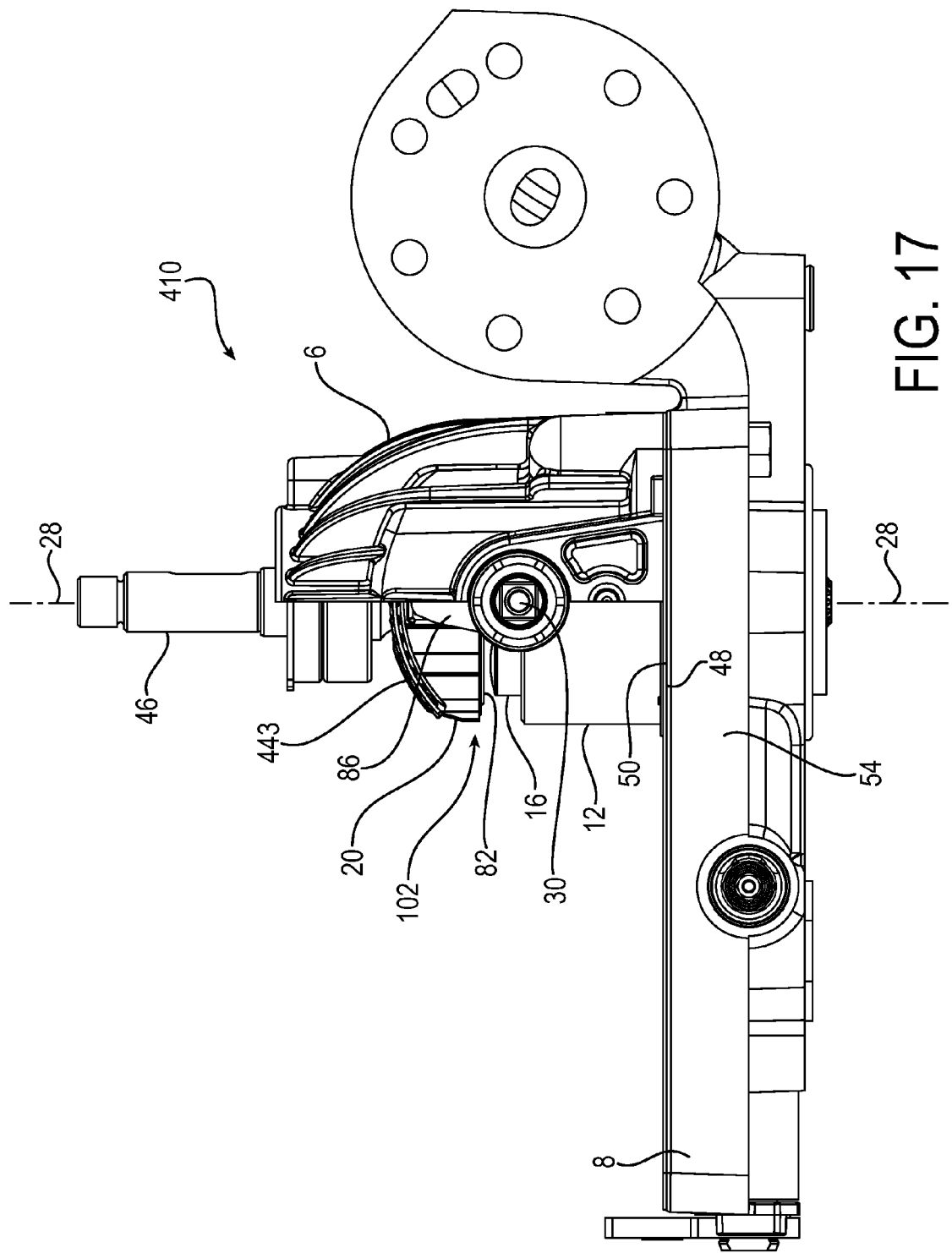
FIG. 17 is a side elevation view of the FIG. 16 axial piston pump as viewed from the plane 17-17 in FIG. 16.

As shown in FIG. 15, the arc shape conical bearing surfaces 240, 241 formed by the housing interior have opposing conical shapes 130, 131 about the axis of rotation 34 of the swash block 20. As is also shown in FIG. 15, the arc shape conical bearing surfaces 44, 45 of the swash block 20 likewise have opposing conical shapes 130, 131 about the axis of rotation 34 of the swash block 20.

In operation, the opposing conical shapes 130, 131 introduce radial alignment forces (vertical alignment forces in the illustrative embodiment) and axial alignment forces (horizontal alignment forces in the direction of the axis of rotation 34 in the illustrative embodiment), for example as shown at arrows 138, 139 in FIG. 15, due to the vertical and horizontal force vectors created by each cone angle 130, 131. The vertical and horizontal force vectors 138, 139 imparted on the conical bearing surfaces 44, 45 of the swash block 20 in many respects yield similar benefits as described above with respect to the embodiment of FIGS. 2-11. Thus, the axial, or thrust, component 139 imparted on the conical bearing surfaces 44, 45 provides guidance for the swash block 20 about its axis of rotation 34 while also providing guidance to prevent lateral movement of the swash block 20 along the axis 34 and prevent rotational movement about the vertical axis 28. As such, the conical bearing surfaces 44, 45 prevent misalignment of the swash block 20 relative to its axis of rotation 34. By preventing misalignment of the swash block 20, the conical bearing surfaces 44, 45 maintain clearances and thus prevent contact between the swash block 20 and mechanical surfaces or edges that are not coated to reduce friction, for example, contact between the walls 109 depending from the interior wall of the upper housing portion 6 and the walls 126 of the swash block 20. As such, drag caused by the contact between these surfaces is eliminated or significantly reduced, and the amount of force needed to actuate the swash block 20 through the control device 30 by an operator is significantly reduced. Of particular significance, the horizontal alignment force 139 created by the opposing cone angles 130, 131 eliminates or significantly reduces dead band caused by movement of the swash block 20 in the yaw direction, or a change in actuation of the control device 30 from one direction to the other. The elimination or reduction of dead band provides the operator with an improved control feel and predictability of input to output or response of the axial piston pump 210.

Reference is now made to FIGS. 16-19, which show views of an axial hydraulic piston pump 410 according to another embodiment of the invention. The axial piston pump 410 of FIGS. 16-19 is in many respects substantially the same as the above-referenced axial piston pumps 10, 210 of FIGS. 2-11 and FIGS. 12-15, and consequently the same reference numerals are used to denote structures corresponding to similar structures in the axial piston pumps 10, 210 of FIGS. 2-11 and FIGS. 12-15. In addition, the foregoing description of the axial piston pumps 10, 210 of FIGS. 2-11 and FIGS. 12-15 is equally applicable to the axial piston pump 410 of FIGS. 16-19, except as may be noted herein. Moreover, it will be appreciated upon reading and understanding the specification that aspects of the axial piston pumps 10, 210, 410 may be substituted for one another or used in conjunction with one another where applicable.

The swash block 20 is slidably mounted within the upper housing portion 6 of the pump 410 for radially and axially guided tilting movement between the afore described upward and downward tilted positions. As shown in FIGS. 16-19, the arc shape grooves 40, 41 of the upper housing portion 6 are defined at their edges by the axially spaced walls 109 depending from the interior wall of the upper housing portion 6. A pair of arc shape conical roller bearings 442, 443 are interposed between the grooves 40, 41 and the upper surface of the swash block 20. As will be appreciated, the arc shape conical roller bearings 442, 443 may comprise any suitable conical roller bearing that reduces friction between the swash block 20 and upper housing portion 6 while transferring radial loads (vertical loads in the illustrative embodiment) and axial loads (horizontal loads in the direction of the axis of rotation 34 in the illustrative embodiment) from the swash block 20 to the upper housing portion 6, including for example tapered roller bearings, needle roller bearings, among others. In the illustrative embodiment, the grooves 40, 41 receive the pair of arc shape conical roller bearings 442, 443 which, in turn, cradle the respective arc shape conical bearing surfaces of the swash block 20. The bearings 442, 443 seat within recesses 122 on the upper surface of the swash block 20. Axially spaced walls 126 adjacent to the recesses 122 fit between inner axially spaced walls 109 of the upper housing portion 6.

Figure 19:
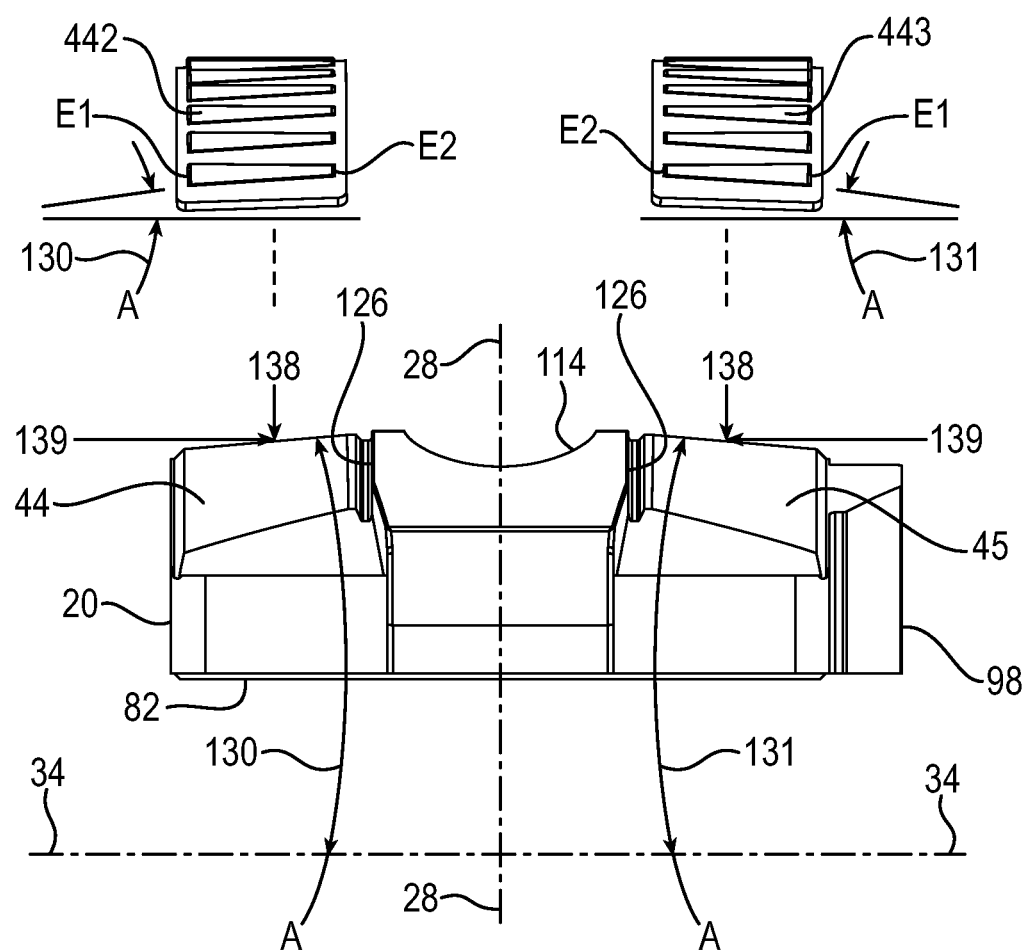
FIG. 19 is a front elevation view of a swash block assembly of the FIG. 16 axial piston pump, additionally showing conical bearings according to the invention.

As shown in FIG. 19, the arc shape conical bearing surfaces 44, 45 of the swash block 20 have opposing conical shapes 130, 131 about the axis of rotation 34 of the swash block 20. As is also shown in FIG. 19, the arc shape conical roller bearings 442, 443 likewise have opposing conical shapes 130, 131 about the axis of rotation 34 of the swash block 20. One way for the arc shape conical roller bearings 442, 443 to realize the opposing conical shapes 130, 131, as shown for example in FIG. 19, is for the arc shape conical roller bearings 442, 443 themselves to be tapered along the axis of rotation 34 from one edge E1, the inner edge in the FIG. 19 embodiment, to an axially opposite edge E2, the outer edge in the FIG. 19 embodiment. It will be appreciated that each opposing conical shape 130, 131 of the arc shape conical roller bearings 442, 443 is defined by a conical plane that is tangent to the linear contact patches of the surfaces of each of the rollers 445 of the bearings 442, 443. Thus, the arc shape conical roller bearings 442, 443 each provide a plane of rollers 445 tilted relative to the axis of rotation 34 that cradle the swash block 20 at the respective arc shape conical bearing surfaces 44, 45 of the swash block 20.

In operation, the opposing conical shapes 130, 131 introduce radial alignment forces (vertical alignment forces in the illustrative embodiment) and axial alignment forces (horizontal alignment forces in the direction of the axis of rotation 34 in the illustrative embodiment), for example as shown at arrows 138, 139 in FIG. 19, due to the vertical and horizontal force vectors created by each cone angle 130, 131. The vertical and horizontal force vectors 138, 139 imparted on the conical bearing surfaces 44, 45 of the swash block 20 in many respects yield similar benefits as described above with respect to the embodiment of FIGS. 2-11 and the embodiment of FIGS. 12-15. Thus, the axial, or thrust, component 139 imparted on the conical bearing surfaces 44, 45 provides guidance for the swash block 20 about its axis of rotation 34 while also providing guidance to prevent lateral movement of the swash block 20 along the axis 34 and prevent rotational movement about the vertical axis 28. As such, the conical bearing surfaces 44, 45 prevent misalignment of the swash block 20 relative to its axis of rotation 34. By preventing misalignment of the swash block 20, the conical bearing surfaces 44, 45 maintain clearances and thus prevent contact between the swash block 20 and mechanical surfaces or edges that are not coated to reduce friction, for example, contact between the edges of the conical roller bearings 442, 443 and the walls 109 depending from the interior wall of the upper housing portion 6, and/or contact between the walls 109 and the walls 126 of the swash block 20. As such, drag caused by the contact between these surfaces is eliminated or significantly reduced, and the amount of force needed to actuate the swash block 20 through the control device 30 by an operator is significantly reduced. Of particular significance, the horizontal alignment force 139 created by the opposing cone angles 130, 131 eliminates or significantly reduces dead band caused by movement of the swash block 20 in the yaw direction, or a change in actuation of the control device 30 from one direction to the other. The elimination or reduction of dead band provides the operator with an improved control feel and predictability of input to output or response of the axial piston pump 410.

Figure 20:
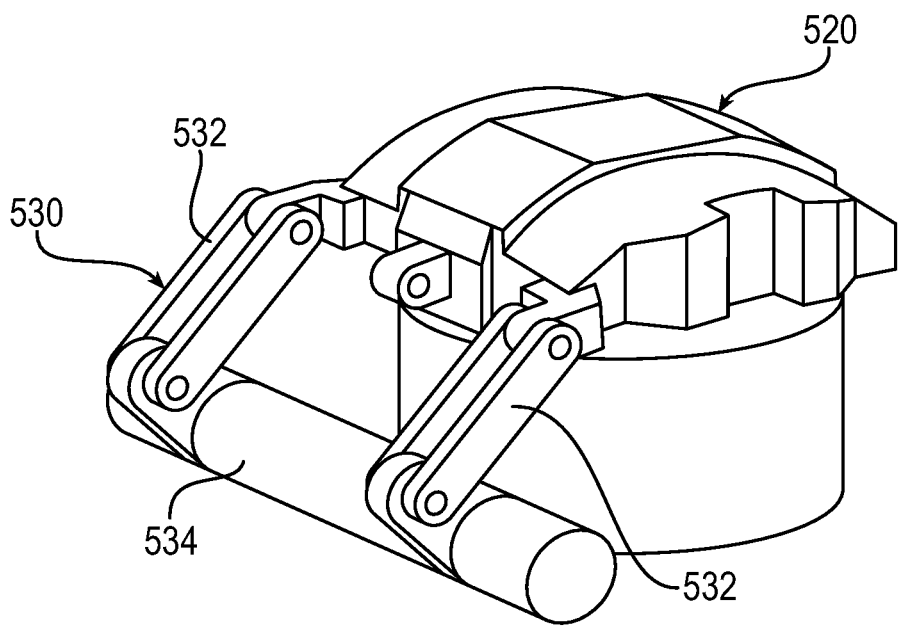
FIG. 20 is a perspective view of a swash block assembly and control device according to the invention.

Turning now to FIG. 20, there is shown a swash block assembly 520 and control device 530 according to the invention. As noted above, the axial hydraulic piston pumps 10, 210, 410 need not be limited to a side input control arm type control device 30, and other actuation devices are contemplated. The control device 530 of FIG. 20 includes a double pin pull mechanism formed by a pair of links 532 pivotably connected at one end to a front portion of the swash block assembly 520 and at the other end to a control arm 534. As shown in FIG. 20, the links 532 are pivotably connected to the swash block 520 at axially opposite ends thereof. The control arm 534 can be actuated by any suitable rotational control input, as would occur to those skilled in the art. Actuation of the control arm 534 pushes and pulls the pair of links 532 which in turn respectively push and pull the front portion of the swash block 520 about its axis of rotation 34 in a manner that tilts the swash block 520 relative to the horizontal, either with the front below horizontal and the rear above horizontal, or with the rear below horizontal and the front above horizontal. It has been found that the control device 530 of FIG. 20 results in improved stability in control of the swash block 530, for all of the axial hydraulic piston pumps 10, 210, 410 described herein. It will be appreciated that the control device 530 could alternatively be connected to the rear of the swash block 520 depending on the application, or a pair of control devices 530 could be connected to the front and rear of the swash block 520 depending on the application.

Figure 21:
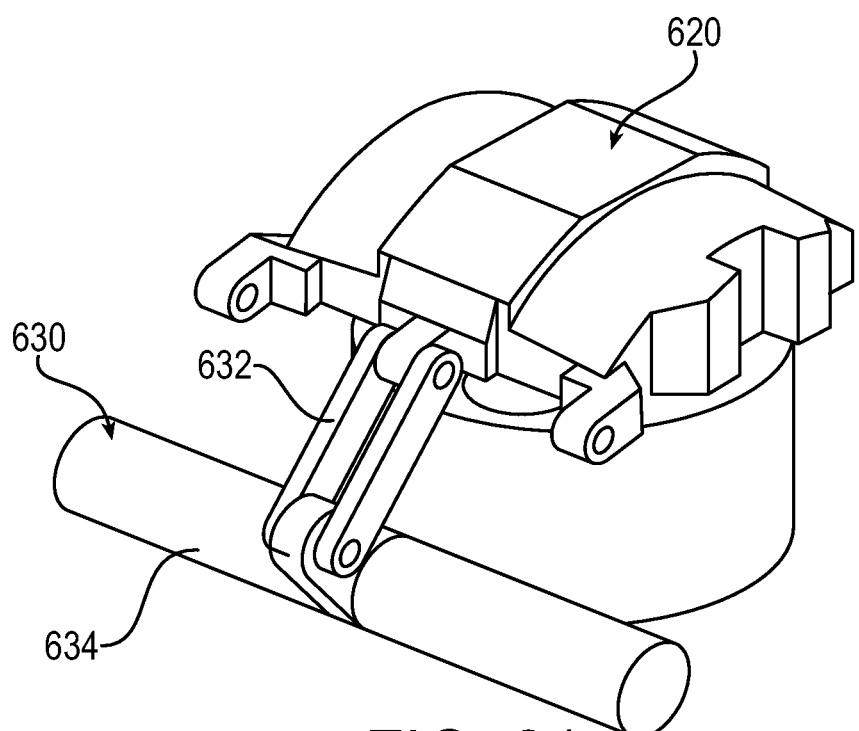
FIG. 21 is a perspective view of a swash block assembly and control device according to another embodiment of the invention.
Figure 22:
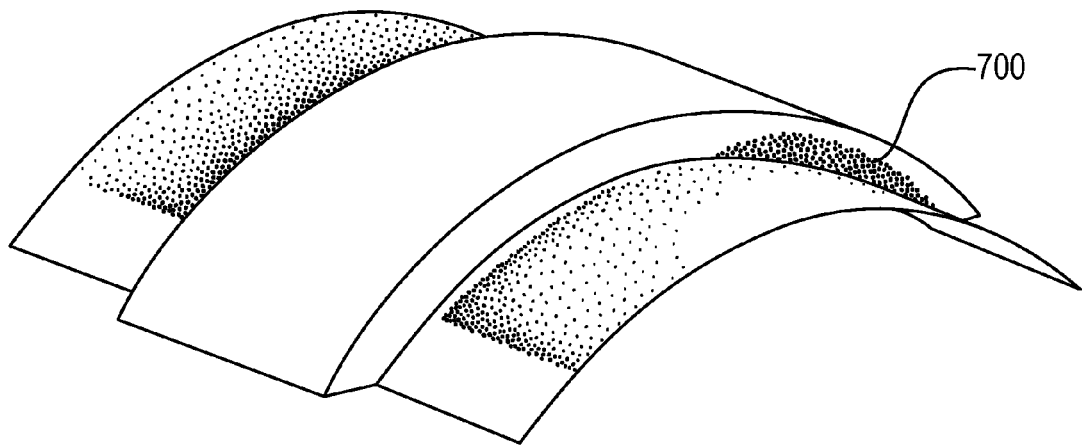
FIG. 22 shows, in the form of different shades, contact stresses on the surface of a swash block having a cylindrical rather than conical surface.

FIG. 21 shows a swash block assembly 620 and control device 630 according to another embodiment of the invention. The control device 630 of FIG. 21 includes a single pull mechanism formed by a link 632 pivotably connected at one end to a front portion of the swash block assembly 620 and at the other end to a control arm 634. The control arm 634 can be actuated by any suitable rotational control input, as would occur to those skilled in the art. Actuation of the control arm 634 pushes and pulls the link 632 which in turn respectively pushes and pulls the front portion of the swash block 620 about its axis of rotation 34 in a manner that tilts the swash block 620 relative to the horizontal, either with the front below horizontal and the rear above horizontal, or with the rear below horizontal and the front above horizontal. It has been found that the control device 630 of FIG. 21 results in improved stability in control of the swash block 630, for all of the axial hydraulic piston pumps 10, 210, 410 described herein. It will be appreciated that the control device 630 could alternatively be connected to the rear of the swash block 620 depending on the application, or a pair of control devices 630 could be connected to the front and rear of the swash block 620 depending on the application.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. An axial piston pump comprising:
a housing;
a cylinder block rotatable within the housing about a vertical axis and including an array of openings in the cylinder block distributed about the vertical axis and an array of pistons reciprocatably movable within the respective openings;

a swash block rotatable about an axis of rotation that is transverse to the vertical axis, wherein the degree of rotation is configured to control the extent of reciprocation of the pistons as the cylinder block rotates; and arc shape conical bushings interposed between the swash block and an interior surface of the housing, wherein the arc shape conical bushings have surfaces tilted relative to the axis of rotation that are configured to guide movement of the swash block rotationally about the axis of rotation and prevent movement of the swash block axially along the axis of rotation.

2. The axial piston pump of claim 1, wherein the tilted surfaces of the arc shape conical bushings are configured to prevent rotational movement of the swash block about a yaw axis that is transverse to the axis of rotation.

3. The axial piston pump of claim 1, further comprising:
at least one link coupled to a front portion of the swath block and actuatable to push and pull the front, portion of the swash block about its axis of rotation in a manner that tilts the swash block relative to horizontal.

4. An axial piston pump comp sing:
a housing;
a cylinder block rotatable within the housing about a vertical axis and including an array of openings in the cylinder block distributed about the vertical axis and an array of pistons, reciprocatably movable within the respective openings; and
a swash block rotatable about an axis of rotation that is transverse to the vertical axis, wherein the degree of rotation is configured to control the extent of reciprocation of the pistons as the cylinder block rotates;
wherein the swash block has arc shape conical bearing surfaces tilted relative to the axis of rotation that are configured to guide movement of the swash block rotationally about the axis of rotation and prevent movement of the swash block axially along the axis of rotation.

5. The axial piston pump of claim 4, wherein the arc shape conical bearing surfaces include a pair of opposed arc shape conical bearing surfaces axially spaced apart along the axis of rotation.

6. The axial piston pump of claim 5, wherein the angle of tilt of one of the pair of arc shape conical bearing surfaces is the same as the angle of tilt of the other of the pair of arc shape conical bearing surfaces.

7. The axial piston pump of claim 5, wherein the pair of opposed arc shape conical bearing surfaces taper away from one another along the axis of rotation.

8. The axial piston pump of claim 4, further comprising arc shape conical bushings interposed between the swash block and an interior surface of the housing, wherein the arc shape conical bushings have surfaces tilted relative to the axis of rotation that cradle the swash block at the respective arc shape conical bearing surfaces.

9. The axial piston pump of claim 8, wherein the arc shape conical bushings are tapered along the axis of rotation from one edge to an axially opposite edge.

10. The axial piston pump of claim 4, wherein an interior wall of the housing defines arc shape conical bearing surfaces tilted relative to the axis of rotation that cradle the swash block at the respective arc shape conical bearing surfaces of the swash block.

11. The axial piston pump of claim 4, further comprising arc shape conical roller bearings interposed between the swash block and an interior surface of the housing, wherein the arc shape conical roller bearings provide a plane of rollers tilted relative to the axis of rotation that cradle the swash block the respective arc shape conical bearing surfaces of the swash block.

12. The axial piston pump of claim 11, wherein the arc shape conical roller bearings are tapered along the axis of rotation from one edge to an axially opposite edge.

13. A hydrostatic transmission comprising:
an axial piston pump according to claim 4, wherein rotation of the cylinder block controls the flow of hydraulic fluid from the pump to a hydraulic motor, and vice versa, to drive the hydraulic motor.

14. A vehicle comprising:
the hydrostatic transmission of claim 13;
an engine for driving the cylinder block of the axial piston pump; and
a drivetrain driven by the hydraulic motor.

15. The axial piston pump of claim 4, further comprising:
at least one link coupled to a front portion of the swash block and actuatable to push and pull the front portion of the swash block about its axis of rotation in a manner that tilts the swash block relative to horizontal.

16. A swash block assembly comprising:
a swash block having an axis of rotation and an opening that extends through the swash block along an axis transverse to the axis of rotation, the swash block including a bottom bearing portion that is configured to interface with a piston rotating group and a top portion that has arc shape bearing surfaces disposed angularly about the axis of rotation and axially on opposite sides of the opening that guide the swash block about the axis of rotation, wherein the arc shape bearing surfaces have conical shapes about the axis of rotation.

17. The swash block assembly of claim 16, wherein the arc shape bearing surfaces are at opposing angles relative to the axis of rotation.

18. The swash block, assembly of claim 16, wherein the arc shape bearing surfaces include dual conical shape opposing surfaces.

19. The swash block assembly of claim 16, wherein the arc shape bearing surface comprises one of a pair of arc shape conical bushings, a pair of arc shape conical roller bearings, or a pair of arc shape conical coated surfaces made of a low friction surface material.

20. The swash block assembly of claim 16, wherein the angles of the conical shapes of the arc shape bearing surfaces relative to the axis of rotation are the same.

* * * * *